United States Patent
Biewald

(10) Patent No.: US 10,013,315 B2
(45) Date of Patent: Jul. 3, 2018

(54) REVERSE SNAPSHOT CLONE

(71) Applicant: SAP SE, Walldorf (DE)

(72) Inventor: Lars-Eric Biewald, Mannheim (DE)

(73) Assignee: SAP SE, Walldorf (DE)

(*) Notice: Subject to any disclaimer, the term of this patent is extended or adjusted under 35 U.S.C. 154(b) by 415 days.

(21) Appl. No.: 14/810,080

(22) Filed: Jul. 27, 2015

(65) Prior Publication Data

US 2017/0031780 A1    Feb. 2, 2017

(51) Int. Cl.
*G06F 17/30* (2006.01)
*G06F 11/14* (2006.01)

(52) U.S. Cl.
CPC ........ *G06F 11/1469* (2013.01); *G06F 17/303* (2013.01)

(58) Field of Classification Search
CPC .............. G06F 11/1469; G06F 17/303; G06F 17/30088
See application file for complete search history.

(56) References Cited

U.S. PATENT DOCUMENTS

| | | | | |
|---|---|---|---|---|
| 8,433,682 B2* | 4/2013 | Ngo | ............ | G06F 11/1471 707/639 |
| 8,572,038 B2* | 10/2013 | Erofeev | ............ | H04L 29/0854 707/634 |
| 9,298,559 B2* | 3/2016 | Ngo | ............ | G06F 11/1471 |
| 9,507,939 B1* | 11/2016 | Lukacs | ............ | G06F 3/0622 |
| 2010/0138440 A1* | 6/2010 | Driesen | ............ | G06F 17/30377 707/765 |
| 2011/0258225 A1* | 10/2011 | Taylor | ............ | G06F 17/30336 707/769 |
| 2011/0295804 A1* | 12/2011 | Erofeev | ............ | H04L 29/0854 707/634 |
| 2014/0032495 A1* | 1/2014 | Erofeev | ............ | H04L 29/0854 707/634 |
| 2014/0324772 A1* | 10/2014 | Prahlad | ............ | G06F 17/30212 707/610 |
| 2018/0032562 A1* | 2/2018 | Taylor | ............ | G06F 17/30336 |

* cited by examiner

*Primary Examiner* — Jean M Corrielus
(74) *Attorney, Agent, or Firm* — Fountainhead Law Group P.C.

(57) ABSTRACT

Embodiments described herein relate to an improved technique for maintaining a consistent state during data migration operations in an active database system. Data can be copied from database table(s) of the active database system into a corresponding database table(s) in the shadow system. Snapshots of the active system can be taken at a specified point in time and used to establish a point of consistency. Later, the snapshot data can be compared with the data in the shadow database system. If the data matches, then the active and shadow database systems are at a consistent state and the data migration process completes. If the data does not match, embodiments are configured to restore the consistent state at the specified point in time by copying the snapshot data into the shadow database table(s).

17 Claims, 18 Drawing Sheets

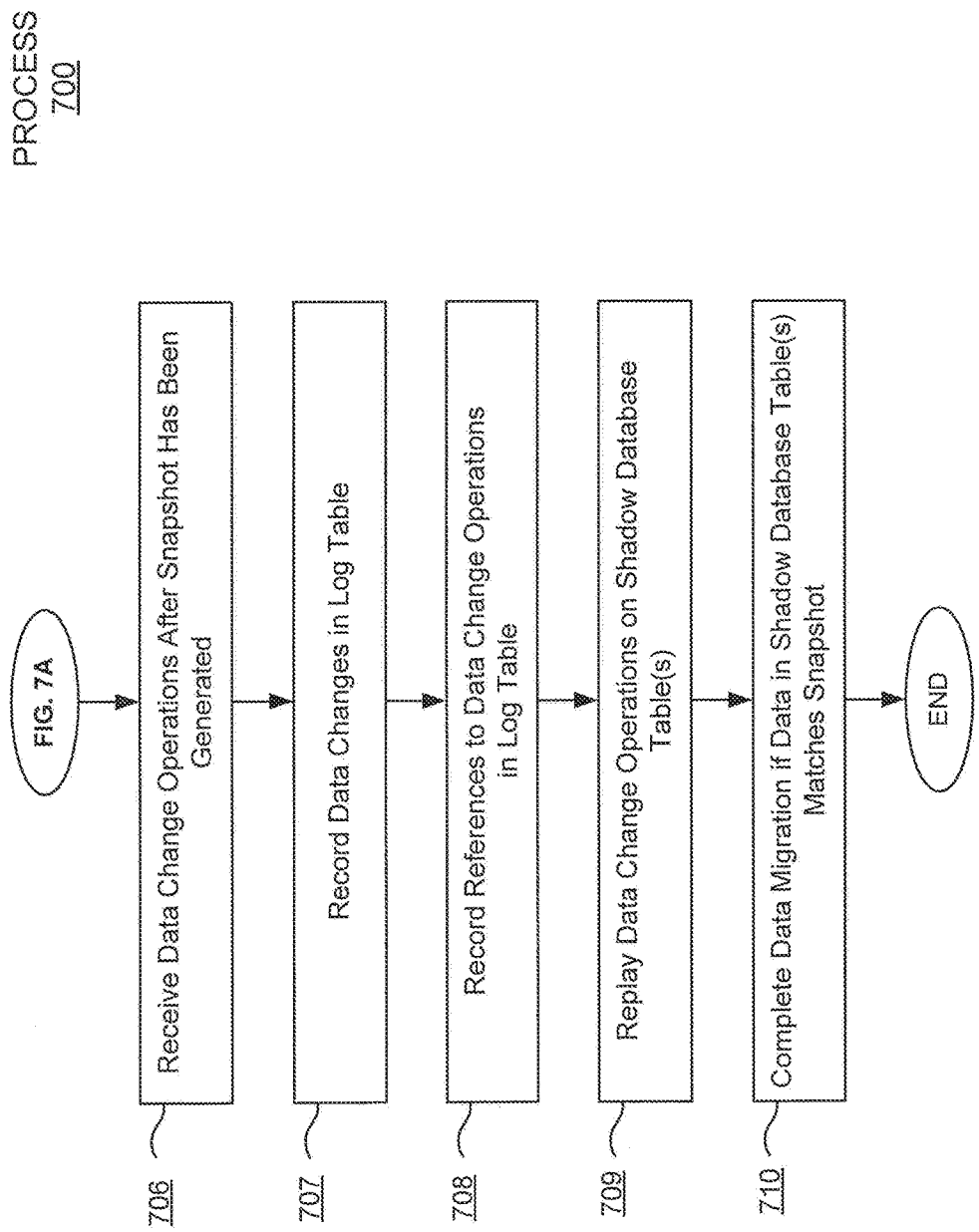

REVERSE SNAPSHOT CLONE

FIELD OF THE INVENTION

At least certain embodiments disclosed herein relate generally to data migration in a database system, and more particularly to maintaining a consistent state during data migration operations.

BACKGROUND

Software systems in the modern era are constantly being upgraded to add additional features, perform additional functionality, improve user interfaces, etc. In many cases, however, upgrading to a new system may require data used by the old system to be migrated into the new system. But such data migration can be a very lengthy and time-consuming process. These migrations can take several hours or even days of system downtime in which the system cannot be used by customers.

Accordingly it is advantageous to perform data migration operations in parallel with operations performed in an active system and accepting new data. To accomplish this, one issue that arises is that the copied data entries from the database tables of the system must be maintained in a consistent state when migrating to the new system. This means that semantic dependencies between database tables in the old system must be consistent and reflect those dependencies when migrating to a new system.

SUMMARY

The embodiments described herein are adapted to maintain a consistent state when conducting a data migration from an active database system to a shadow database system. Embodiments are configured to copy data from a database table of an active database system into a corresponding database table of a shadow database system. In one embodiment, the data from the active database system can be copied over to the shadow database system during a time interval when active data operations are being performed on the data in the active database system so that the data migration operations can be performed without system downtime.

In order to accomplish this, embodiments can be configured to generate a snapshot image of the database tables of the active database system at a specified point in time. The snapshot image can be stored into a snapshot database table and utilized as the point of consistency for the data stored in the active and shadow database systems. When all the data from the active database system has been copied into the shadow database system, the data entries stored in the database table of the shadow database system can be compared with the corresponding data entries stored in the snapshot table. If the data matches, then the active and shadow database systems are at a consistent state and the data migration process completes. If the data does not match, embodiments are configured to restore the consistent state by copying the data stored in the snapshot table into the corresponding entries of the database table of the shadow database system to establish the consistent state at the specified point in time when the snapshot was taken.

In addition, active data change operations can be received while the system is copying the data between the active and shadow database systems. That is, active data change operations can be received after the specified point in time. The changes to the data can be recorded in a log table. One or more references to the data change operations that caused the data change can also be recorded in the log table. The data change operations recorded in the log table can then be replayed to the database table in the shadow database system to capture any changes to the data after the specified point in time.

In another embodiment, a database system for maintaining a consistent state during data migration is described. Such a system can include a processor, a memory coupled with the processor via an interconnect line, and a database configured to store data in data tables. The system further includes an update management engine coupled with the database. The update management engine is adapted to facilitate data migration from a database table of an active database system into a corresponding database table of a shadow database system. In one embodiment, the data from the active database system can be copied into the corresponding database table of the shadow database system during a time interval when active data operations are being performed on the data in the active database system.

The update management engine can be configured to generate a snapshot of the active database system and storing the snapshot into a snapshot table at a specified point in time. The snapshot taken at the specified point in time can be used as the point of consistency for the data stored in the active and shadow database systems. After all the data has been copied from the active database system to the shadow database system, the update management engine can be configured to compare the data stored in the database table of the shadow database system with the data stored in the snapshot table. If the data matches, then the active and shadow database systems are at a consistent state and the data migration process completes. If the data does not match, embodiments are configured to perform a restore operation to restore the consistent state by copying the data entries in the snapshot table into the corresponding data entries in the database table of the shadow database system to establish the point of consistency at the point in time when the snapshot was taken.

In yet other embodiments, a non-transitory computer readable storage medium adapted to perform operations for maintaining a consistent state during data migration is disclosed. The operations can include (1) storing an image of data in a database table of an active database system into a snapshot table at a specified point in time, (2) copying the data into a corresponding database table of a shadow database system during a time interval when active data operations are being performed on the data in the active database system, (3) after the data has been copied into the database table of the shadow database system, comparing the data stored in the database table of the shadow database system with the corresponding data stored in the snapshot table, (4) restoring a consistent state when the data in the database table of the shadow database system does not match the corresponding data in the snapshot table, wherein restoring comprises copying data stored in the snapshot table into the database table of the shadow database system, and (5) completing data migration when the data stored in the database table of the shadow database system matches the data stored in the snapshot table.

The following detailed description and accompanying drawings provide a better understanding of the nature and advantages of the present invention.

BRIEF DESCRIPTION OF THE DRAWINGS

For a better understanding of at least certain embodiments, reference will be made to the following detailed description, which is to be read in conjunction with the accompanying drawings.

FIGS. 7A-7B depict an example embodiment of a process for maintaining a consistent state during data migration from an active database system to a shadow database system.

DETAILED DESCRIPTION

Figure 1:
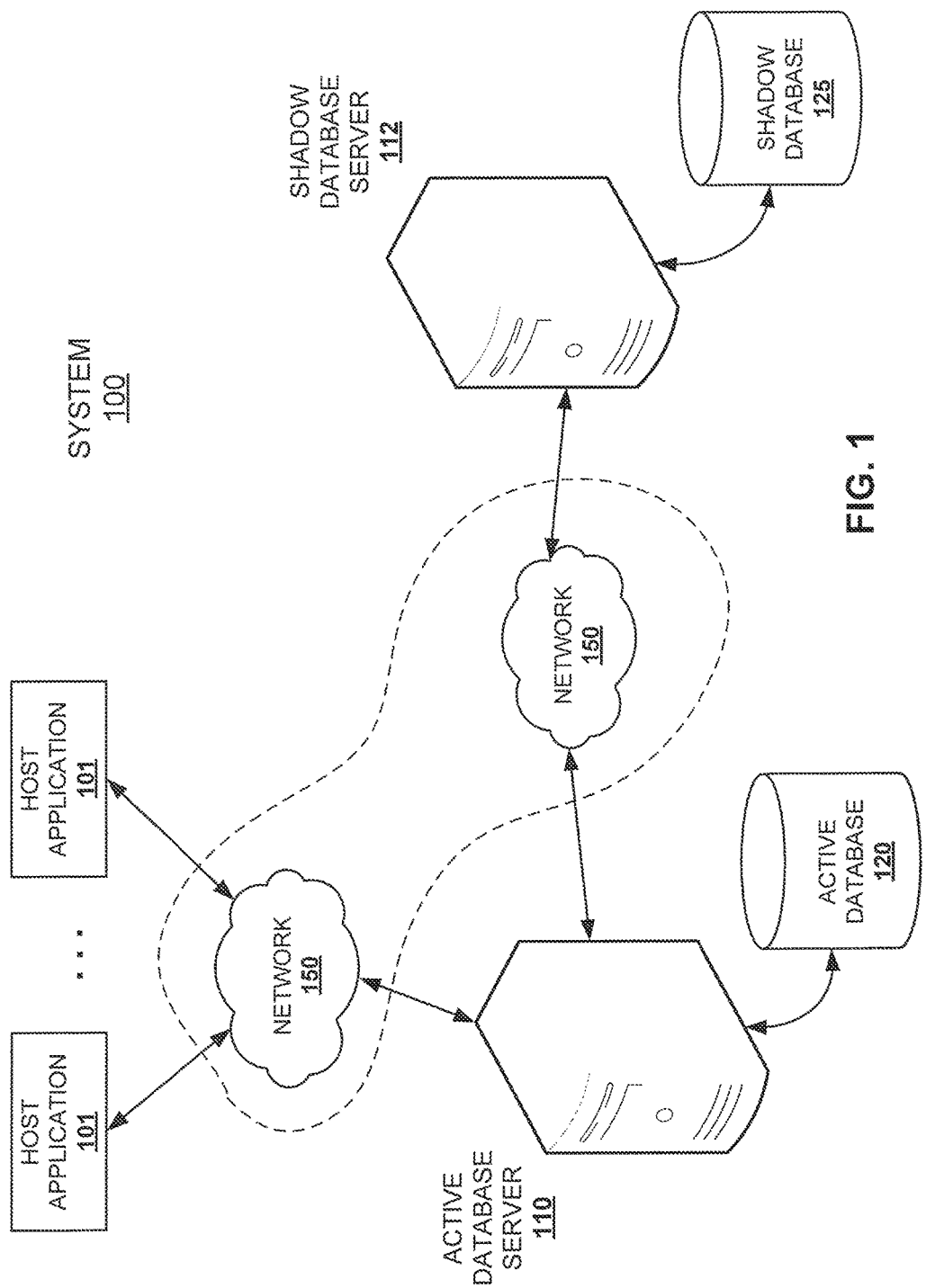
FIG. 1 depicts an overview block diagram of an example embodiment of a system configured to migrate data between an active database system and a shadow database system.

Throughout the description, for the purposes of explanation, numerous specific details are set forth in order to provide a thorough understanding of the present invention. It will be apparent to one skilled in the art, however, that the present invention may be practiced without some of these specific details. In other instances, well-known structures and devices are shown in block diagram form to avoid obscuring the underlying principles of the invention.

I. General Overview

It is generally advantageous to reduce business downtime during data migration operations. There are currently investigations into running data migrations during times when systems are operational and capable of receiving data change operations by users. The embodiments described herein involve improved techniques for maintaining a consistent transactional state during data migration from a source database system to a target (or destination) database system. As used herein, the term "active database system" may be used to describe the source database system, and the term "shadow database system" may be used to describe the target or destination database system. In one embodiment, the data can be generated by one or more applications and received via one or more application programming interfaces ("APIs"). In such cases, the database tables include application database tables.

The embodiments described herein are adapted to migrate data. This can be accomplished by copying data stored in a database table of an active database system into a corresponding database table of a shadow database system. In one embodiment, the data from the active database system can be copied into the database table of the shadow database system during a time interval when active data operations are being performed on the data in the active database system.

In order to accomplish this, embodiments can be configured to generate a snapshot image of the database tables of the active database system at a specified point in time. The snapshot image can be stored into a snapshot table and later used as the point of consistency for the data stored in the active and shadow database systems at the specified point in time.

In order to generate the snapshot image, snapshots are generated at predetermined time intervals, which each subsequent snapshot capturing the changes to the data entries since the previous snapshot was taken. Data entries which have changed or have been modified since a previous snapshot was taken are stored within the snapshot table. During a restore operation, data in the snapshot table representing the differences in the data entries since the last snapshot was taken is merged together with the data copied into the shadow database system. Any data entry stored in the snapshot table is restored. All unchanged entries copied to the shadow system however remain untouched, as the copy process already stored these data entries in the shadow database table. The combination of the data contents stored in the snapshot table combined with the data entries in the corresponding database tables copied to the shadow database system can therefore be seen as a complete snapshot.

After all the data has been copied into the shadow database system, the data entries stored in the database table of the shadow database system can then be compared with the corresponding data entries stored in the snapshot. If the data matches, then the active and shadow database systems can be said to be at a consistent state and the data migration process completes. If the data does not match, embodiments are configured to restore the consistent state by copying the data entries stored in the snapshot table into the corresponding data entries in the database table of the shadow database system to establish the consistent state at the time the snapshot was taken.

Since the data can be migrated during active operations, any active data change operations can be received and processed while the system is copying the data between the active and shadow database systems. The changes to the data can be recorded in a log table. One or more references to the data change operations that resulted in the data changes can also be recorded in a log table. The data change operations recorded in the log table can then be replayed to the database table in the shadow database system to capture any changes to the data after the specified point in time.

The data change operations include "update" operations for updating the data stored in the active database system, "insert" operations for inserting new data into the active database system, or "delete" operations for deleting data from the active database table. During the restore operation, the data from the database table of the shadow database system can be updated when the data change operation was an update operation, deleted when the data change operation was an insert operation, or when the data change operation was a delete operation.

In addition, the tables of the active database system can generally be copied into the corresponding tables of the shadow database system separately, and can be copied in any order without knowledge of dependencies between database tables. Further, the data migration can include migrating the data to a different database system or migrating the data within a same database system.

II. Exemplary Systems

Provided below is a description of an example system upon which the embodiments described herein may be implemented. Although certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner.

In addition, hardwired circuitry may be used independently or in combination with software instructions to implement the techniques described herein. The described functionality may be performed by specific hardware components containing hardwired logic for performing operations, or by any combination of custom hardware and programmed computer components. The techniques described herein are not limited to any specific combination of hardware circuitry or software. Embodiments can also be practiced in distributed computing environments where tasks are performed by remote processing devices that are linked through one or more wire-based or wireless networks.

FIG. 1 depicts an overview block diagram of an example embodiment of a system configured to migrate data between an active database system and a shadow database system. In the illustrated embodiment, system 100 includes active database server 110 in communication with active database 120 and shadow database server 112 in communication with shadow database 125. The active database server 110 may be in remote communication with the active database 120 via one or more networks (not shown). Alternatively, the active database 120 may be a component of the active database server 110 and configured to communicate with the active database 120 via any type of interconnect line or network. Similarly, the shadow database server 112 may be in remote communication with the shadow database 125 via one or more networks (not shown), or may be a component of the shadow database server 112 and configured to communicate with the shadow database 120 via any type of interconnect or network.

The application servers 210 and 212 may be implemented as individual computer hardware servers, or as an array of computer hardware servers logically connected together and working in coordination with each other to perform the functionality described herein. Generally, a data server includes a system that performs data operations with respect to data stored in one or more repositories of data. Depending on the type of data server, data operations may range from simple operations, such as storing and retrieving the data, to more complex operations such as calculating statistics based on the data, or arranging or formatting the data.

In addition, databases 120 and 125 may include any type of database system. One example embodiment includes a relational database system, in which data is stored in highly structured tables comprised of rows and columns, and accessed through rigid data storage rules ("schemas"). Other examples of database systems include event-based systems where data can be stored in a semi-structured or unstructured format.

System 100 also includes a plurality of host application processes 101 in communication with the active database server 110 via one or more network(s) 150. Host applications 101 can perform data accesses operations on data stored in database 120 by communicating data access requests/commands to the active database server 110 via network(s) 150. Server 110 can be configured to receive the data access requests from host applications 101 and to provide responses to the data access requests over the network(s) 150.

During a data migration process, data stored in database tables of the active database 120 can be copied into corresponding database tables of the shadow database 125. Database servers 110 and 112 are in communication together via one or more network(s) 150. As shown, network(s) 150 can be the same network or different networks in communication with one another. As will be appreciated, network(s) 150 can be any wired or wireless network(s). For example, the networks described herein can be implemented as a local area network ("LAN"), wide-area network ("WAN"), combination of LANs and WANs, the Internet, or any other type of communication network adapted for exchanging electronic messages and information. The networks can be implemented as a physical array of hardware resources or as a virtual array, or any combination thereof; they can also be implemented in a cloud-based configuration. For example, the networks described herein can be implemented as a public or private cloud network or combination thereof. No specific network or network architecture should be construed as limiting the embodiments described herein.

In addition, in the illustrated embodiment, server 110 and database 120 are separate and remote from server 112 and database 125. In an alternate embodiment, servers 110 and 112 may be combined into a single server and facilitate data migration from separate databases 120 and 125. In another alternate embodiment, databases 120 and 125 may also be combined into a single database and facilitate data migration within a single database system.

In one embodiment, a system update (or other event) may "trigger" data to be migrated from active database 120 to shadow database 125. In one embodiment, this can be performed using a "database trigger." As used herein, a "database trigger" refers to procedural code that can be automatically executed in response to certain events on a particular database table or view in a database. The trigger is mostly used for maintaining the integrity of the information on the database. For example, when a new employee record is added to an employee database table, new records should also be created in other related database, e.g., for taxes, vacations and salaries, etc.

During the data migration operation, data stored in active database 120 can be copied to shadow database 125. But data migration may require significant amount of time for the data to be copied from the active database 120 to the shadow database 125. For instance, it may take several hours or even days for all the customer database tables and application database tables to be copied to the corresponding database tables in the shadow database 125.

During this time, data change operations may be performed in the active database 120. In one embodiment, data change operations can be received by the active database server 110 from the host applications 101 via network(s) 150. The data change operations can include update, insert, or delete operations. Whenever data is changed as a result of a data change operation, the change must be accounted for in the data migration process in order to maintain a consistent transactional state.

Figure 2:
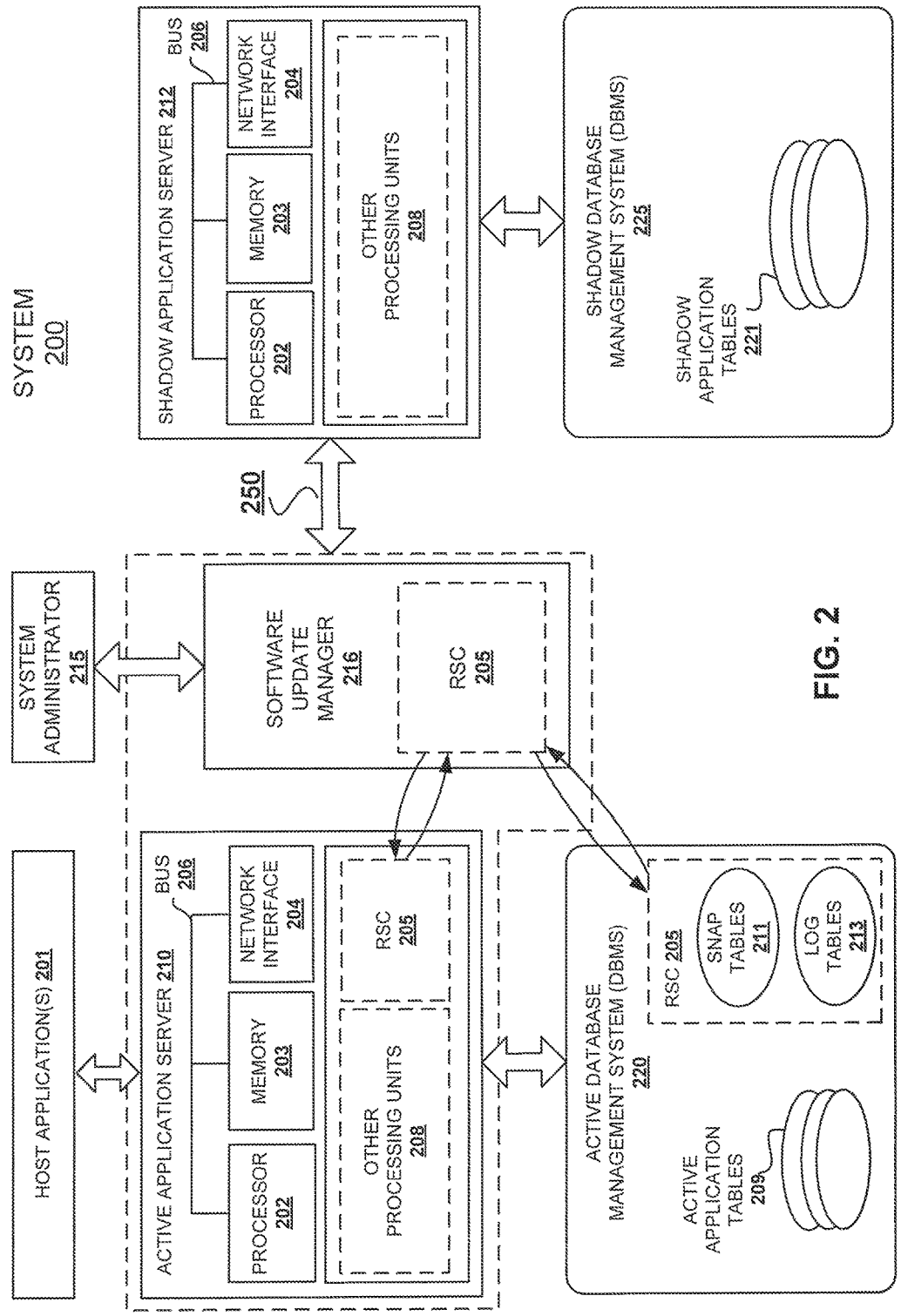
FIG. 2 depicts a block diagram of an example embodiment of a system configured to migrate data between two separate database systems.

FIG. 2 depicts a block diagram of an example embodiment of a system configured to migrate data between two separate database systems. In the illustrated embodiment, system 200 includes an active application server 210 in communication with a shadow application server 212 via one or more networks 250. Active application server 210 and shadow application server 212 each include one or more processor(s) 202, a memory system 203, and a network interface 204 coupled together via an interconnect bus 206. Servers 210 and 220 further include other processing units 208 to perform various functions within the application servers 210 and 212 respectively.

As shown, the active application server 210 is in communication with an active database management system ("DBMS") 220 and the shadow application server 212 is in communication with the shadow DBMS 225. The active DBMS 220 includes active application tables 209 and a reverse snapshot clone unit ("RSC") 205. The shadow DBMS 225 includes corresponding shadow application tables 221. The application servers 210 and 212 may be implemented as individual computer hardware servers, or as an array of computer hardware servers working in coordination with each other.

As shown, the active application server 210 includes a reverse snapshot clone unit 205. The reverse snapshot clone units 205 and the other processing units 208 may be implemented in hardware, software, or combination thereof. For example, processing units 208 may be implemented in software modules stored in a non-transitory computer readable medium and accessed via the memory system 203. Alternatively, the reverse snapshot clone units 205 and the other processing units 208 may be implemented as hardwired circuitry configured to perform the functions and operations, or as a combination of computer hardware and software components.

During data migration operations, the reverse snapshot clone unit 205 of the active application server 210 can work in conjunction with the reverse snapshot clone unit 205 of the active DBMS 220 and the reverse snapshot clone unit 205 of the software update manager 216 to maintain a consistent transactional state. In one embodiment, the software update manager 216 is in communication with the active application server 210 via one or more networks (not shown). Alternatively, the software update manager 216 may be a component of the active application server 210. A system administrator 215 may communicate with the software update manager 216 via one or more networks or via a direct hard-wired or wireless connection.

Host applications 201 are in communication with active application server 210 and may be configured to access data within the active DBMS 220 and to perform data change operations on the data stored in the active application tables 209. During a data migration operation, the embodiments described herein may be adapted to copy data from the data stored within the active application tables 209 of DBMS 220 to the corresponding shadow application tables 221 of DBMS 225. Because a data migration operation may take a lengthy amount of time, data from the active DBMS 220 can be copied into the shadow application tables 221 during a time interval when active data operations are being performed on the data in the active database system.

In order to accomplish this, the software update manager 216 may be configured to utilize the reverse snapshot clone unit 205 to assist with the data migration in order to maintain a consistent transactional state between the data stored in the active application tables 209 and the shadow application tables 221. The reverse snapshot clone unit 205 can be configured to generate a snapshot image of the active application tables 209 of the active DBMS 220 at a specified point in time. The snapshot image can be used as the point of consistency for the data stored in the active and shadow database systems. The snapshot image of the active application tables 209 can be stored into the snapshot table(s) 211.

In at least certain embodiments, after all the data has been copied from the active database system to the shadow database system, the software update manager 216 can be adapted to compare the data stored in the shadow application tables 221 with the data stored in the snapshot tables 211. If the data entries stored in the shadow application tables 221 matches the corresponding data entries in the snapshot table, then the system can be said to be at a consistent state. In such a case, the migration process can be completed. But if the data stored in the data entries stored in the shadow application tables 221 do not match the corresponding data entries in the snapshot table, embodiments are configured to restore a consistent state between the application tables of the active and shadow DBMSs respectively. In the case of a data inconsistency, the data stored in the snapshot tables 211 can be copied into the shadow application tables 221 of the shadow DBMS 225 to establish the consistent state at the specified point in time when the snapshot was taken.

In addition, since the data can be migrated during active operations of the active application server 210, any active data change operations received from the host applications 201 can be received and processed by the active application server 210 while the system is copying the data between the active and shadow database systems. The software update manager 216 can be configured to record the changes to the data as a result of the data change operations into a log tables 213. References to the data change operation(s) corresponding to the data changes can also be stored in the log tables. The data change operations recorded in the log tables 213 can then be replayed to the shadow application tables 221 in the shadow DBMS 225 to capture any changes to the data after the specified point in time and to facilitate restoring the database systems to a consistent state.

The changes to the data can include updating the data in the active application tables 209, inserting new data into the active application tables 209, or deleting data from the active application tables 209. During the restore operation, the data from the shadow application tables 221 of the shadow database system can be deleted when the data change operation was an insert operation, or it can be re-inserted when the data change operation was a delete operation. In addition, the tables of the active DBMS 220 can generally be copied into the corresponding application tables 221 of the shadow database system separately, and can be copied in any order without knowledge of dependencies between database tables.

Figure 3:
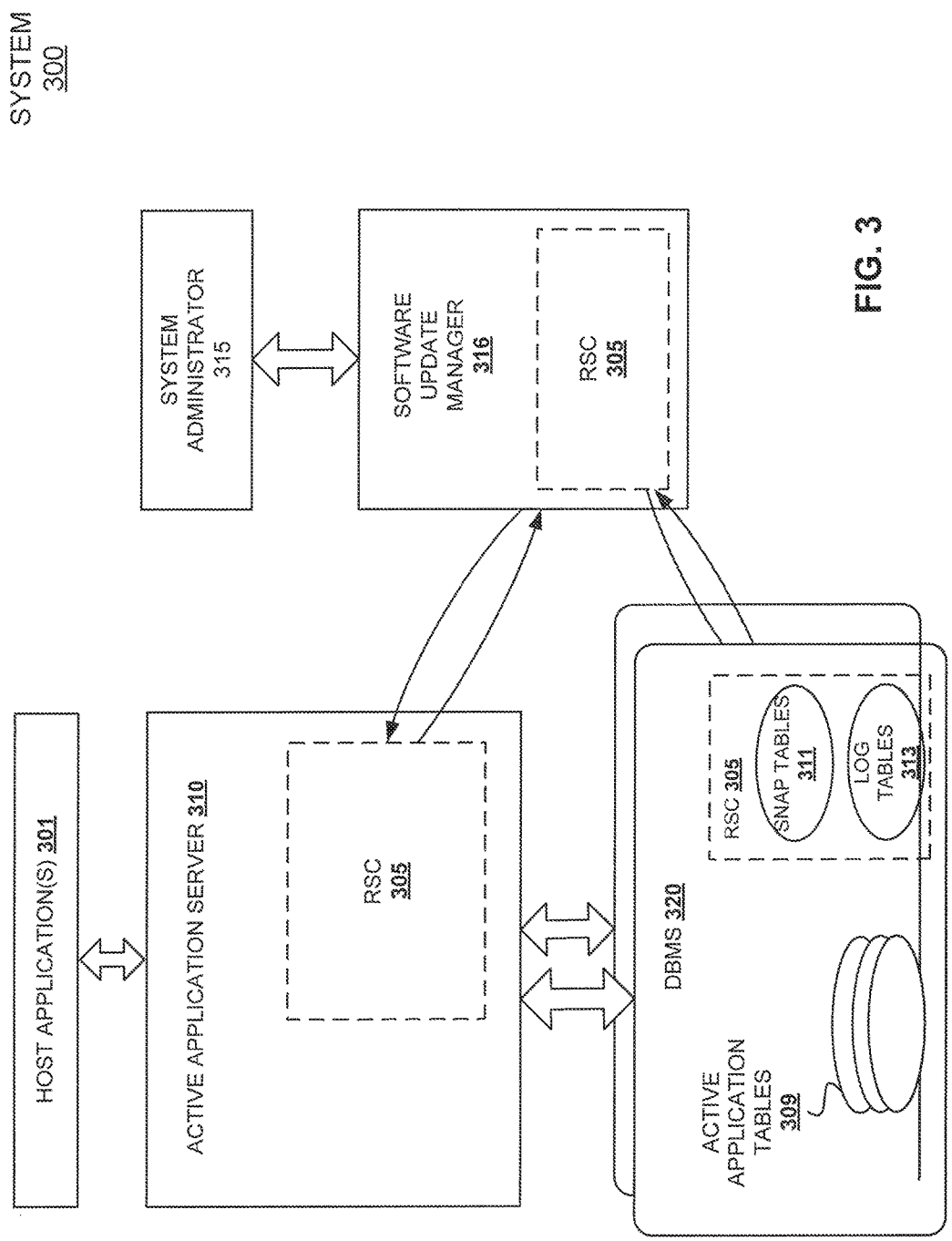
FIG. 3 depicts a block diagram of an example embodiment of a system configured to migrate data within a same database system.

As discussed above, the data migration can include migrating the data to a different database or migrating the data within a same database between two subsystems. FIG. 3 depicts a block diagram of an example embodiment of a system configured to migrate data within a same database system. In the illustrated embodiment, system 300 includes an application server 310 in communication with one or more DBMSs 320 and host applications 301. The data migration operations can be performed within the single database system 310 between the DBMSs 320. In one embodiment, the DBMSs 320 may be virtual DBMSs.

As above, the active application server 310 includes one or more processor(s), a memory system, and a network interface coupled together via an interconnect bus. The active application server 310 is in communication with one or more DBMSs 320. As shown, the DBMSs 320 include active application tables 309 and a reverse snapshot clone unit 305. The application server 310 may be implemented as individual computer hardware servers, or as an array of computer hardware servers working in coordination with each other.

During data migration operations, the reverse snapshot clone unit 305 of the active application server 310 can work in conjunction with the reverse snapshot clone unit 305 of the DBMSs 320 and the reverse snapshot clone unit 305 of the software update manager 316 to facilitate maintaining a consistent state. In one embodiment, the software update manager 316 is in communication with the active application server 310 via one or more networks (not shown).

Alternatively, the software update manager 316 may be a component of the active application server 310. A system administrator 315 may communicate with the software update manager 316 via one or more networks or via a direct hard-wired or wireless connection.

Host applications 301 are in communication with active application server 310 and may be configured to access data within the DBMSs 320 and to perform data change operations on the data stored in the active application tables 309. During a data migration operation, the embodiments described herein may be adapted to copy data from the data stored between active application tables 309 of the respective DBMSs 320. Because a data migration operation may take a lengthy amount of time, data from the DBMSs 320 can be copied during a time interval when active data operations are being performed on the data in the active database system.

In order to accomplish this, the software update manager 216 may be configured to utilize the reverse snapshot clone unit 305 to assist with the data migration in order to maintain a consistent transactional state among the data stored in the active application tables 309 of the various DBMSs 320. The reverse snapshot clone unit 305 can be configured to generate a snapshot image of the active application tables 309 at a specified point in time. The snapshot image can be used as the point of consistency for the data stored in the respective DBMSs. The snapshot image of the active application tables 309 can be stored into a snapshot table(s) 311.

In at least certain embodiments, after all the data has been copied from the active database system to the shadow database system, the software update manager 316 can compare the data stored in an application tables 309 of a first DBMS 320 with the data stored in the snapshot tables 311. If the data matches, then the one or more DBMSs 320 can be said to be in a consistent state and the migration process is complete. But if the data entries stored in the active application tables 309 does not match the corresponding data entries in the snapshot table 311, embodiments are configured to restore a consistent state between the application tables of the DBMSs 320 respectively. In the case of a data inconsistency, the data stored in the snapshot tables 311 can be copied into the respective application tables 309 of the respective DBMS 320 to establish the consistent state at the specified point in time when the snapshot was taken.

In addition, since the data can be migrated during active operations of the active application server 310, any active data change operations received from the host applications 301 can be received and processed by the active application server 310 while the system is copying the data. The software update manager 316 can be configured to record the changes to the data as a result of the data change operations into a log tables 313. References to the data change operation(s) corresponding to these data changes can also be stored in the log tables 313. The data changes recorded in the log tables 313 can then be replayed to the virtual application tables 309 in the shadow virtual DBMS 320 to capture any changes to the data after the specified point in time and to facilitate restoring the database systems to a consistent state. In addition, the application tables of the active DBMS 320 can generally be copied separately and can be copied in any order without knowledge of dependencies between database tables.

Figure 4:
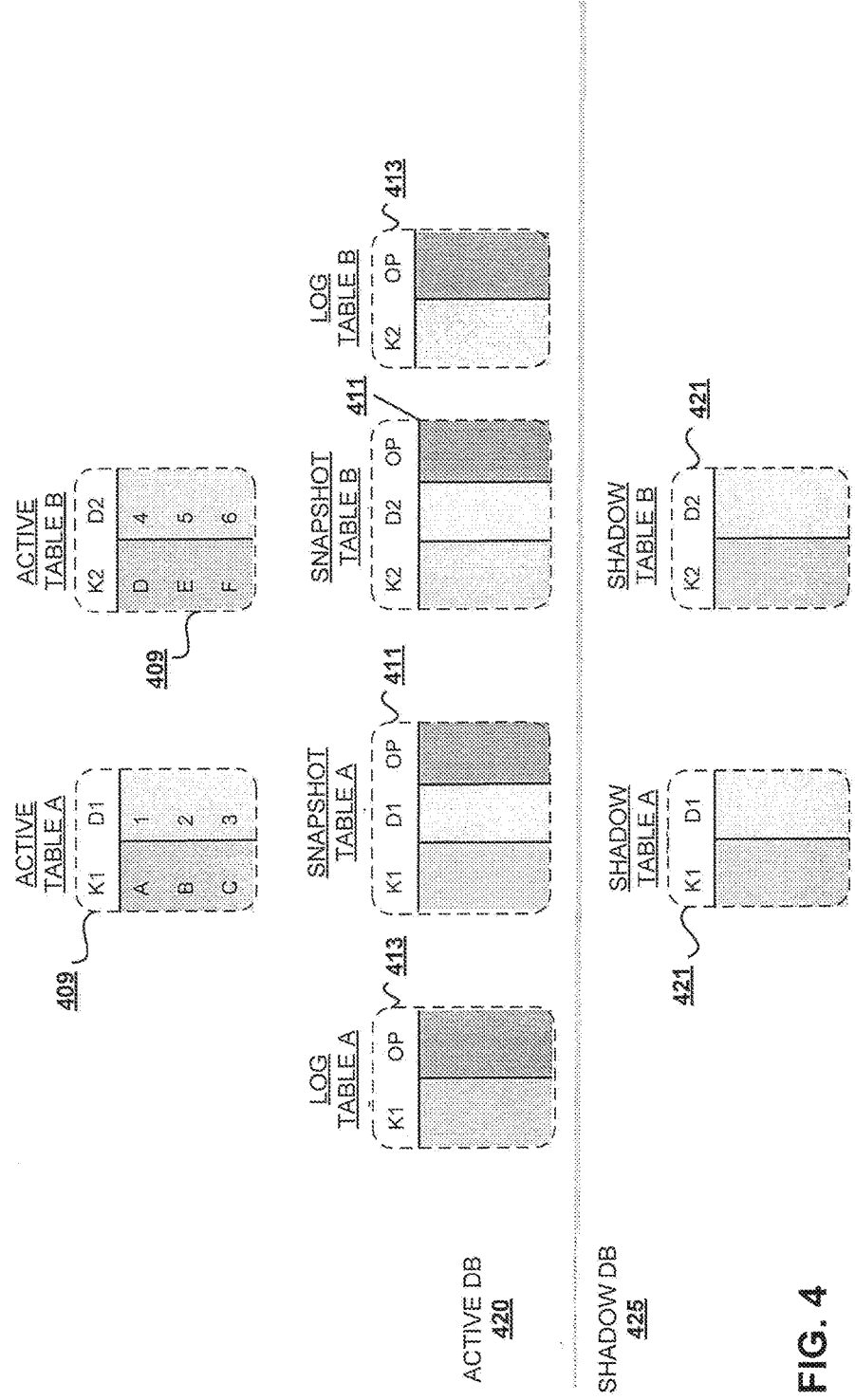
FIG. 4 depicts an example embodiment of an initial configuration of database tables to be migrated in the database system described herein.

FIG. 4 depicts an example embodiment of an initial configuration of database tables to be migrated in the database system described herein. In this initial configuration, data is to be migrated from active database system 420 to the shadow database system 425. More specifically, data 409 is to be copied from active database tables A and B of the active database system 420 into the respective shadow database tables A and B of the shadow database system 425.

In the illustrated embodiment, the active database system 420 includes active database tables A and B, which each include fields for storing data 409. The fields for storing data 409 include a key field "K" and a data field (D") Likewise, the shadow database system 425 includes shadow database tables A and B, which each include a key field "K" and a data field "D" for storing data 421. In addition, the active database system 120 includes log tables A and B comprising data 413 and snapshot tables A and B comprising data 411. As discussed above, the log table data 413 can be used to record ongoing data change operations submitted by users of the system, and the snapshot table data 411 can be utilized for storing snapshots to establish a point of transactional consistency between the active database system 420 and the shadow database system 425 at a specified point in time.

III. Exemplary Processes

FIGS. 5A-5F, 6A-6F, and 7A-7B depict example embodiments of processes for maintaining a consistent state during data migration in a database system. It is noted that the processes described below are exemplary in nature and are provided for illustrative purposes and not intended to limit the scope of the invention to any particular example embodiment. For instance, methods in accordance with some embodiments described herein may include or omit some or all of the operations described below, or may include steps in a different order than described herein. The particular methods described are not intended to be limited to any particular set of operations exclusive of all other potentially intermediate operations.

In addition, the operations may be embodied in computer-executable code, which causes a general-purpose or special-purpose computer to perform certain functional operations. In other in stances, these operations may be performed by specific hardware components or hardwired circuitry, or by any combination of programmed computer components and custom hardware circuitry.

Figure 5A:
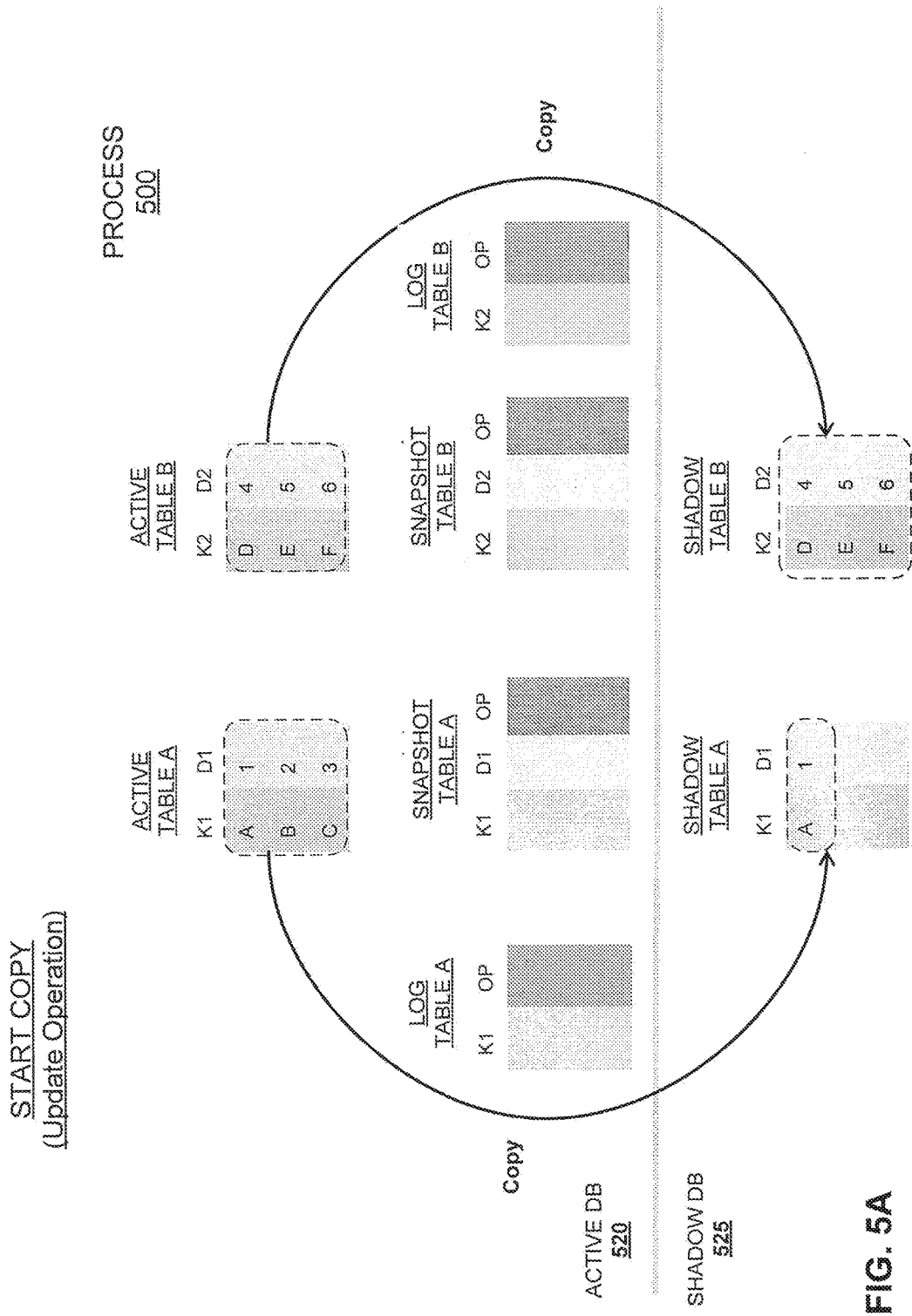
FIGS. 5A-5F depict an example embodiment of a process for maintaining a consistent state during an update data change operation.

FIG. 5A depicts an example embodiment of a process for maintaining a consistent state during an update data change operation. In the illustrated embodiment of process 500, the data entries A-F of active database tables A and B are being copied into corresponding data entries A-F of the shadow database tables A and B respectively. As shown, during the copy operation all of the data in active database table B is copied to the shadow database table B, but only data entry A of the active database table A is copied into the corresponding entry A of the shadow database table A. In one embodiment, all database tables start recording together at the same transaction time.

Figure 5B:
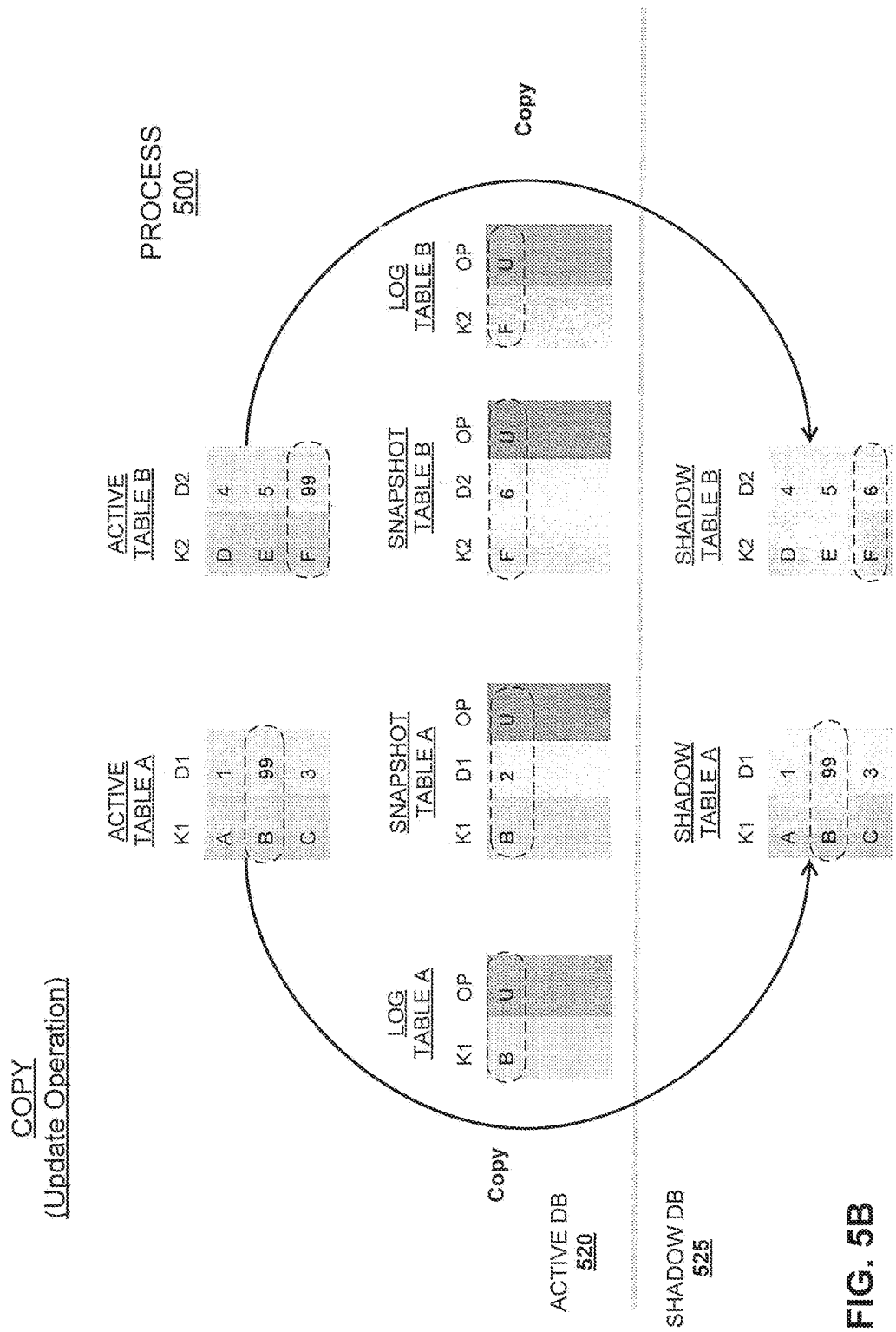

Referring to FIG. 5B, an "update" operation is performed on the active database system 520 while the copy operation is underway. As shown, data entry B of the active database table A and data entry F of the active database table B are updated to a value of 99. The data entry B of active database table A is copied to the corresponding entry B in the shadow database table A, but the data entry F of the active database table B is not copied to the corresponding data entry F in the shadow database table B. This happens when table B has been completely copied before the update operation occurs at active database system 520, but table A has not been fully copied before the update operation occurs.

In such a case, log entries 513 are entered into log tables A and B respectively showing that an update operation ("U") has been received for the data entries B and F of the respective active database tables A and B. In addition, snapshot entries 511 are generated in snapshot tables A and B respectively indicating that an update operation has been performed on the respective data entries B and F. The snapshot entries 511 also store the respective values of entries B and F at the time the snapshot was taken. That is, snapshot entries 511 include the values of the entries B and F taken before the update operation was received at the active database system 520.

As shown, the changes for data entry B are copied to the shadow of database table A, but the changes for data entry F are not copied. As discussed above, this is because the active table B (containing entry F) has already completed the copy process, whereas table A is still in the midst of the copy process when the update occurs. So the data entry B (value 99) is updated in the active database table A and copied to the data entry B in the shadow database table A during the ongoing copy process. Embodiments described herein are adapted to resolve such inconsistency.

Figure 5C:
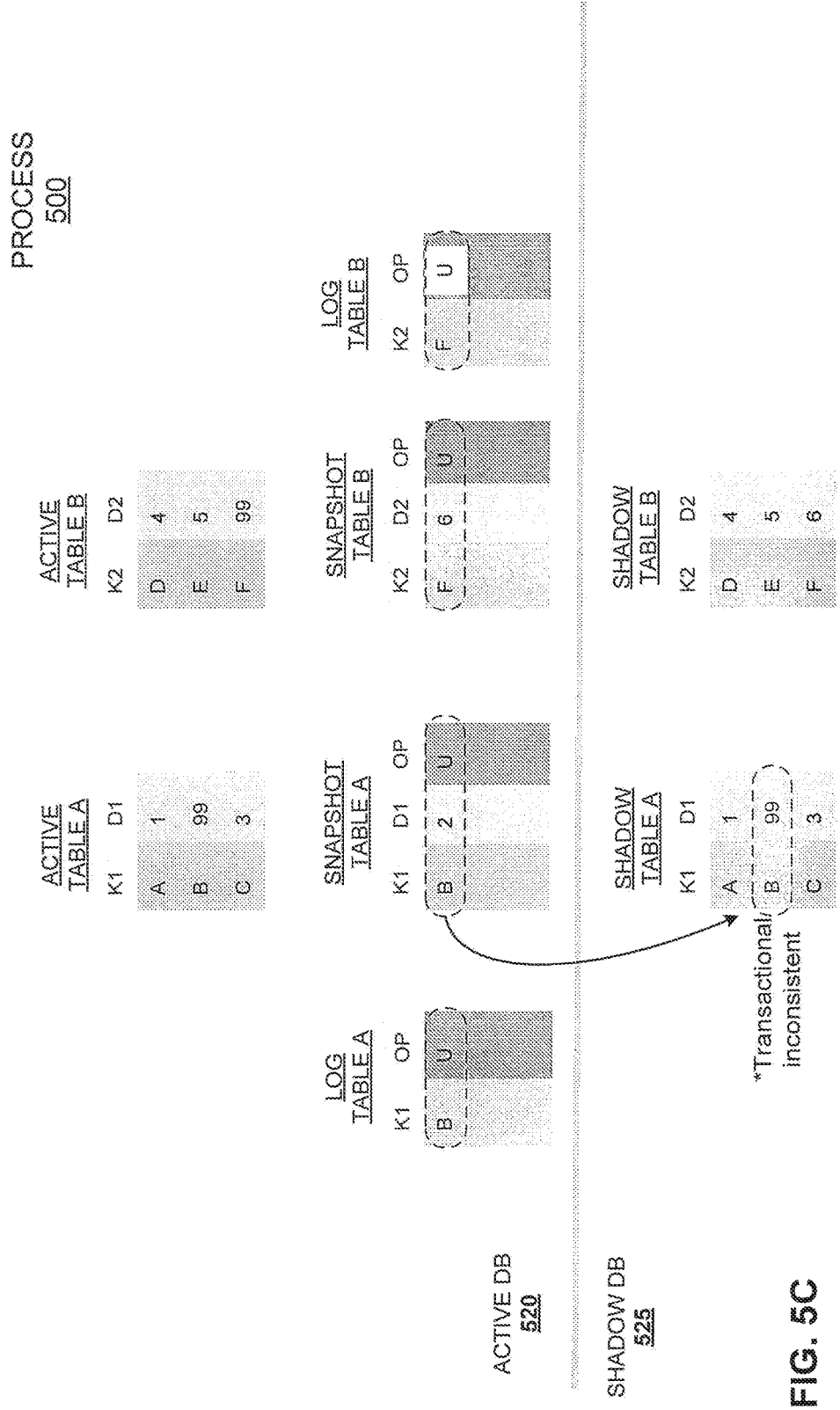
Figure 5D:
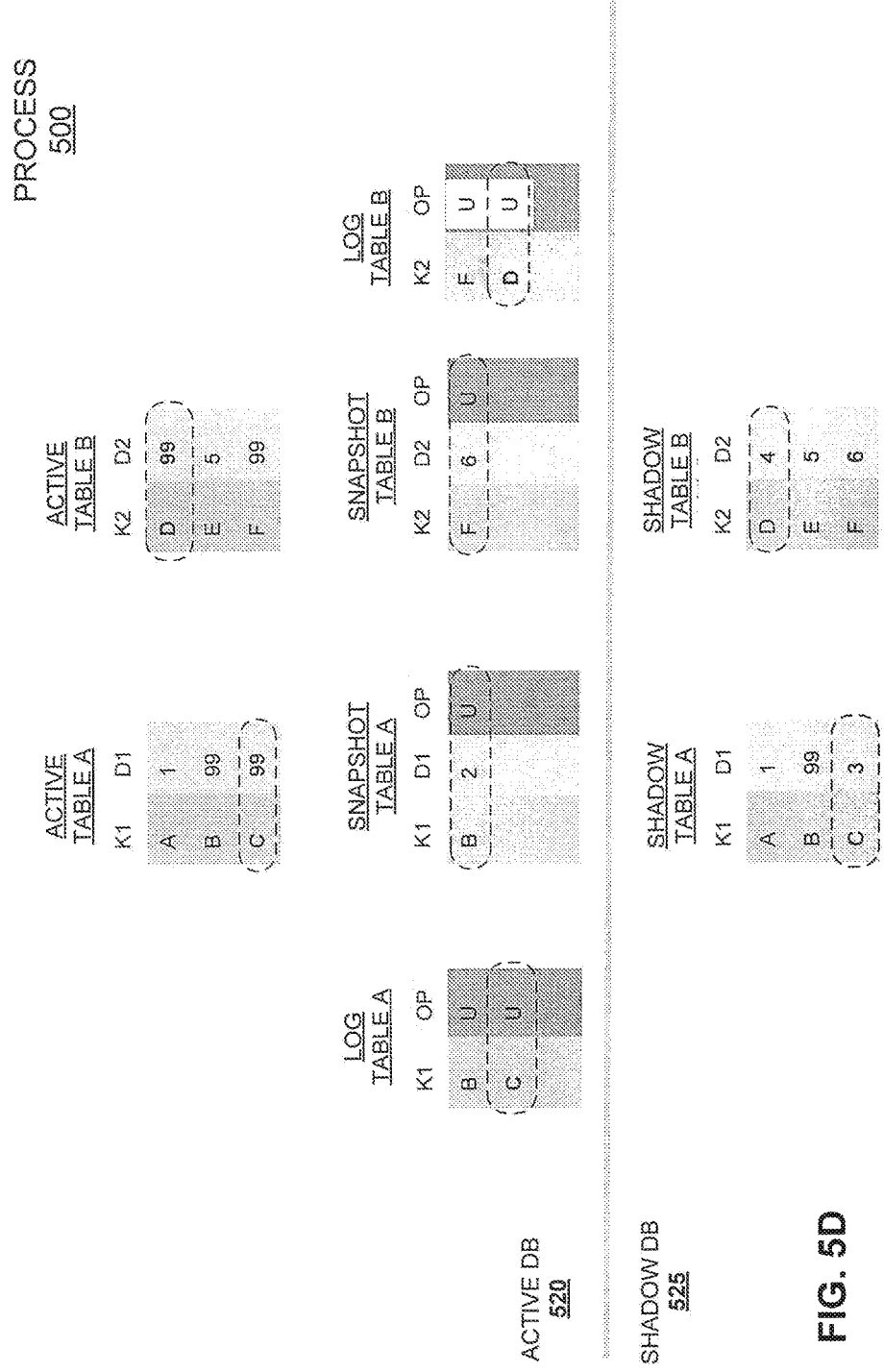

Referring to FIG. 5C, at the conclusion of the copy process, the value of the entry B in the shadow database table A is inconsistent with the corresponding entry B in the snapshot table A. FIG. 5D depicts a case where the copy process has completed for the update operation, but the data change operations continue at the active database system 520. As shown, the data triggers switched again after the copy operation has completed, updating the values C and D of the active database tables A and B respectively. Since the copy process is completed, the snapshot tables are no longer updated and retain the values from the specified point in time when the snapshot of the active database system 520 was generated.

However, the entries in the log table remain active to capture all changes subsequent to the creation of the snapshot. These additional changes can be replayed to the shadow database system 525 to capture all the data changes. In addition since the copy process has completed, the shadow database tables A and B are also locked and do not update with the additional data change operations.

Figure 5E:
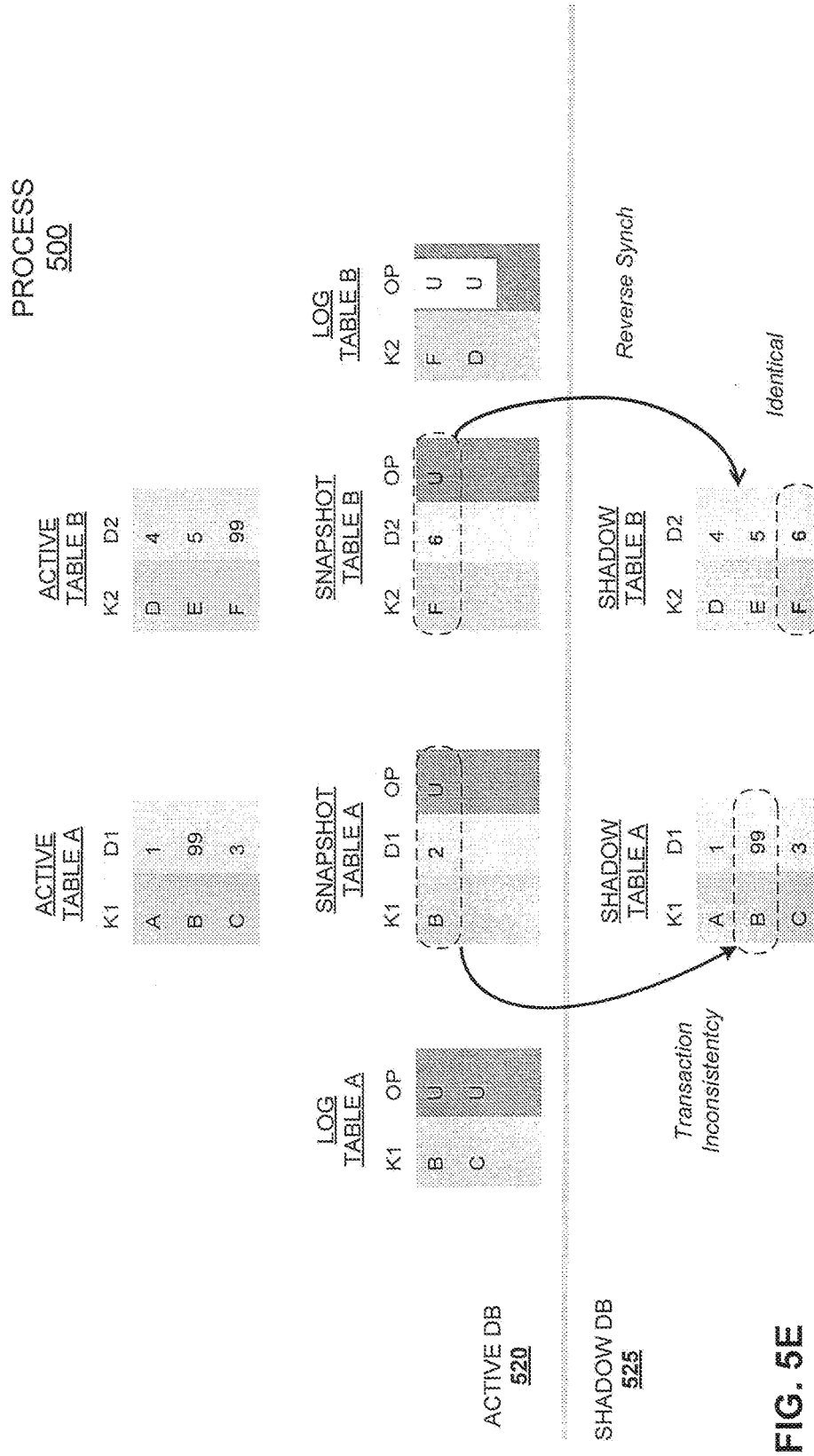

With the data content of the snapshot table, it is later on possible to restore a transactional consistent state in the copy database tables with a reverse synchronization ("reverse synch") operation in order to capture all the subsequent data changes. Each record in the snapshot table can be checked to determine if it is identical with the record in the copied table. If not, the record from the snapshot table is written into the copied table. With this approach, it is possible to restore a transactional continuous state to the point in time when the snapshot was taken. FIG. 5E depicts initiating a reverse sync operation on the shadow database tables A and B. As shown, the state of the data entries of the shadow database table B and the snapshot table B are identical. Accordingly nothing is updated in the reverse synch operation on the shadow database table B. But the state of the data entry B in the shadow database table A is inconsistent with the corresponding data entry B in the snapshot table B. Accordingly the shadow database table A needs to be restored to the consistent state at the time the snapshot was generated.

Figure 5F:
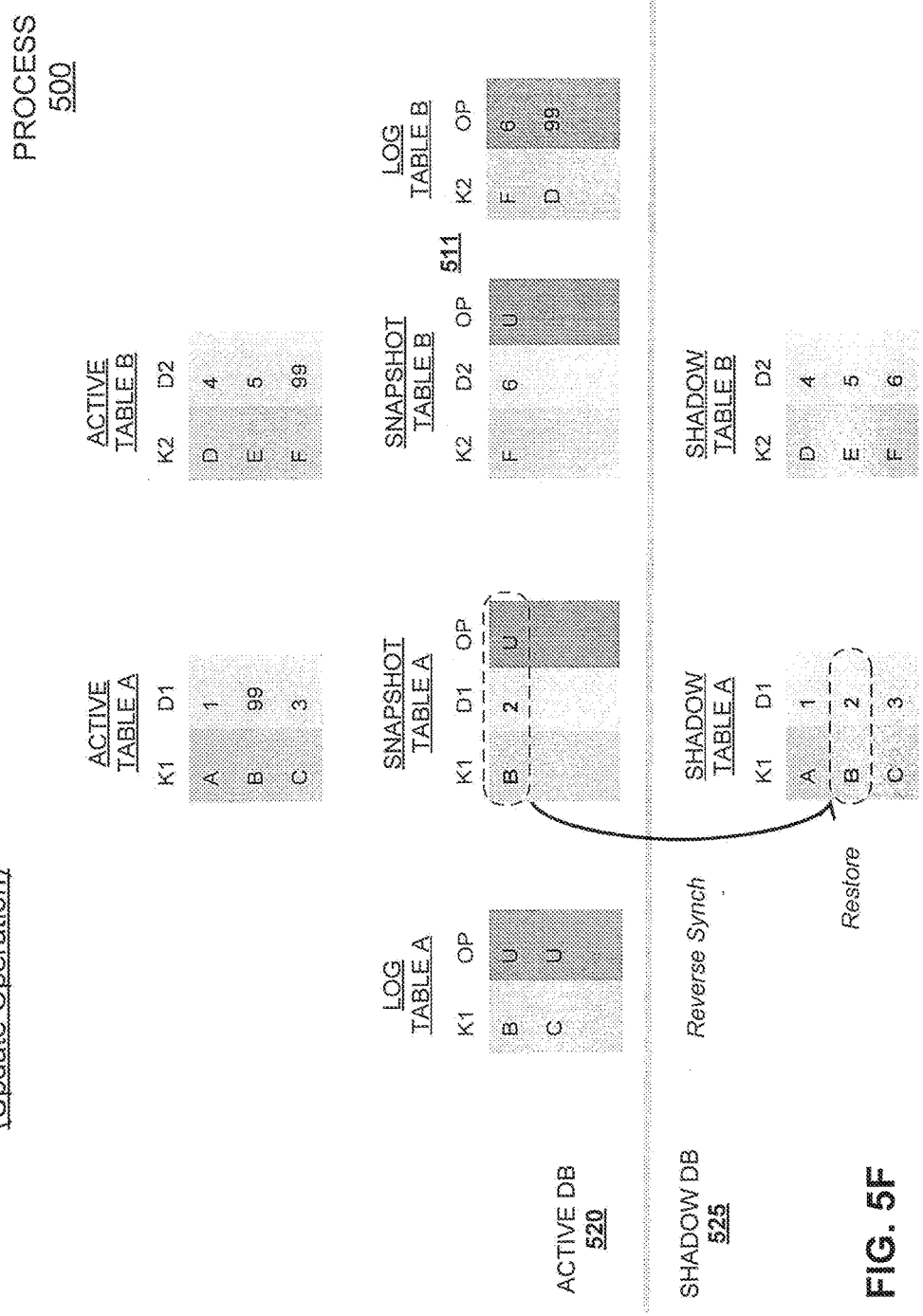

FIG. 5F depicts performing a reverse synch operation on the shadow database table A. As discussed above, the state of the data entry B of the shadow database table A was inconsistent with the corresponding data entry B in the snapshot table A. Accordingly the value "2" in the data entry B in the snapshot table A is copied into the corresponding data entry B of the shadow database table A to restore the application tables to a consistent state at the time the snapshot was taken. This completes process 500 according to an example embodiment.

Figure 6A:
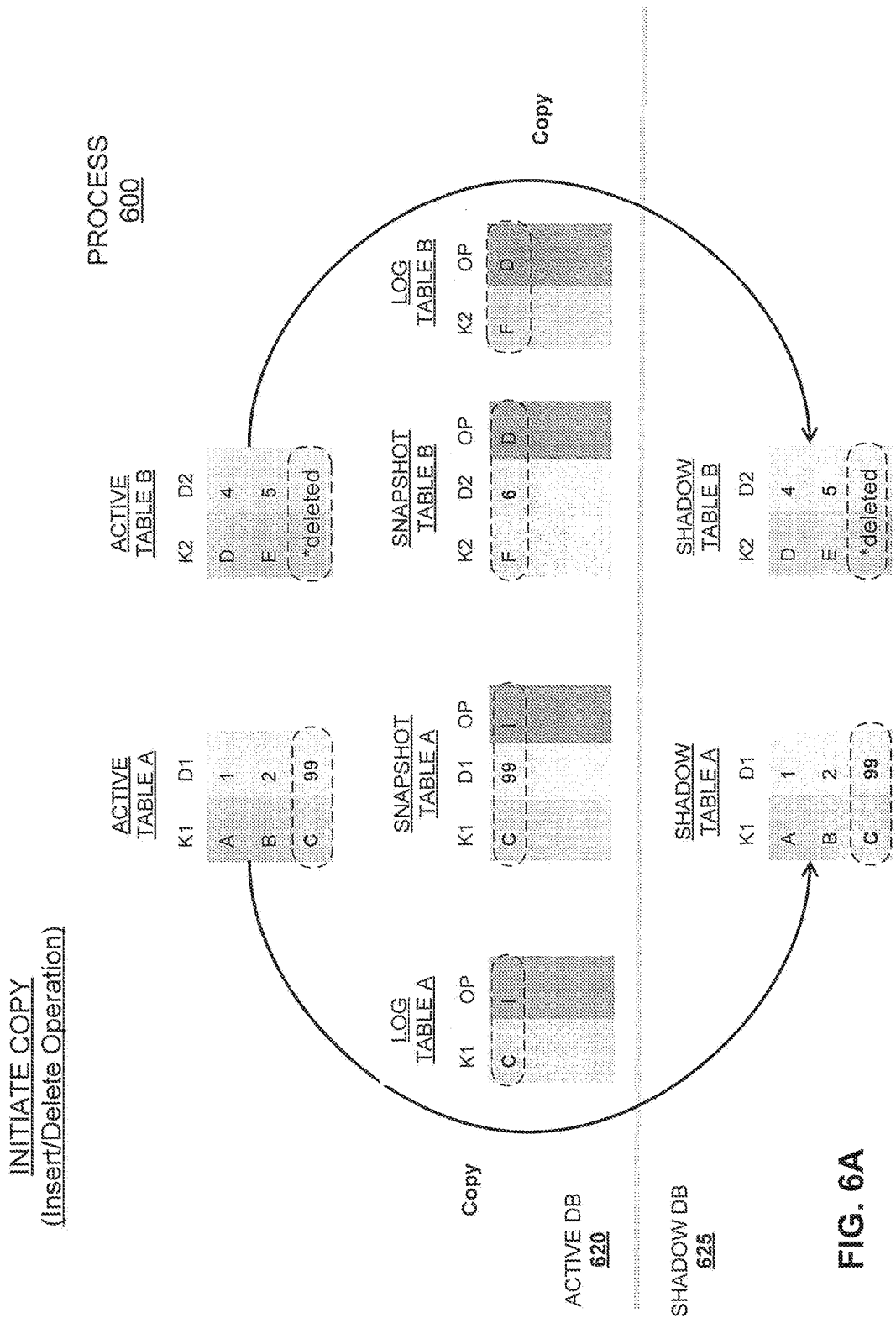
FIGS. 6A-6E depict an example embodiment of a process for maintaining a consistent state during insert/delete data change operations.

FIG. 6A depict an example embodiment of a process for maintaining a consistent state during "insert"/"delete" data change operations. As above, in the illustrated embodiment, process 600 begins by initiating copying of the data entries stored in the active database tables A and B into the corresponding data entries of the shadow database tables A and B. In one embodiment, the database trigger switches and the tables start recording the copied data at the same transaction time. FIG. 6A depicts the occurrence of insert/delete data change operations on the data entries stored in the active database tables A and B while the data migration is underway and data changes are currently being copied from the active database tables A and B into the corresponding shadow database tables A and B respectively.

As shown in the illustrated embodiment, an insert operation has been performed to insert a data value 99 into data entry C of the active database table A, and a delete operation has been performed to delete the data value 6 from the active database table B. In this embodiment, both of the insert and delete data change operations depicted in FIG. 6A occurred during the copy process. Accordingly the data changes to the active database tables A and B were therefore copied over to the shadow database tables A and B respectively. The value 99 has been copied to the data entry C in the shadow database table A and the value 6 has been deleted from the data entry F of the shadow database table B.

In addition, the entries of log tables A and B have been populated with the changes to the data entries and the corresponding references to the data change operations (references "I" and "D" indicating insert and delete operations respectively). Further, snapshot tables A and B have been generated and populated with data entries reflecting the changes to the data and references to the associated data change operations that have been performed resulting in those data changes.

Figure 6B:
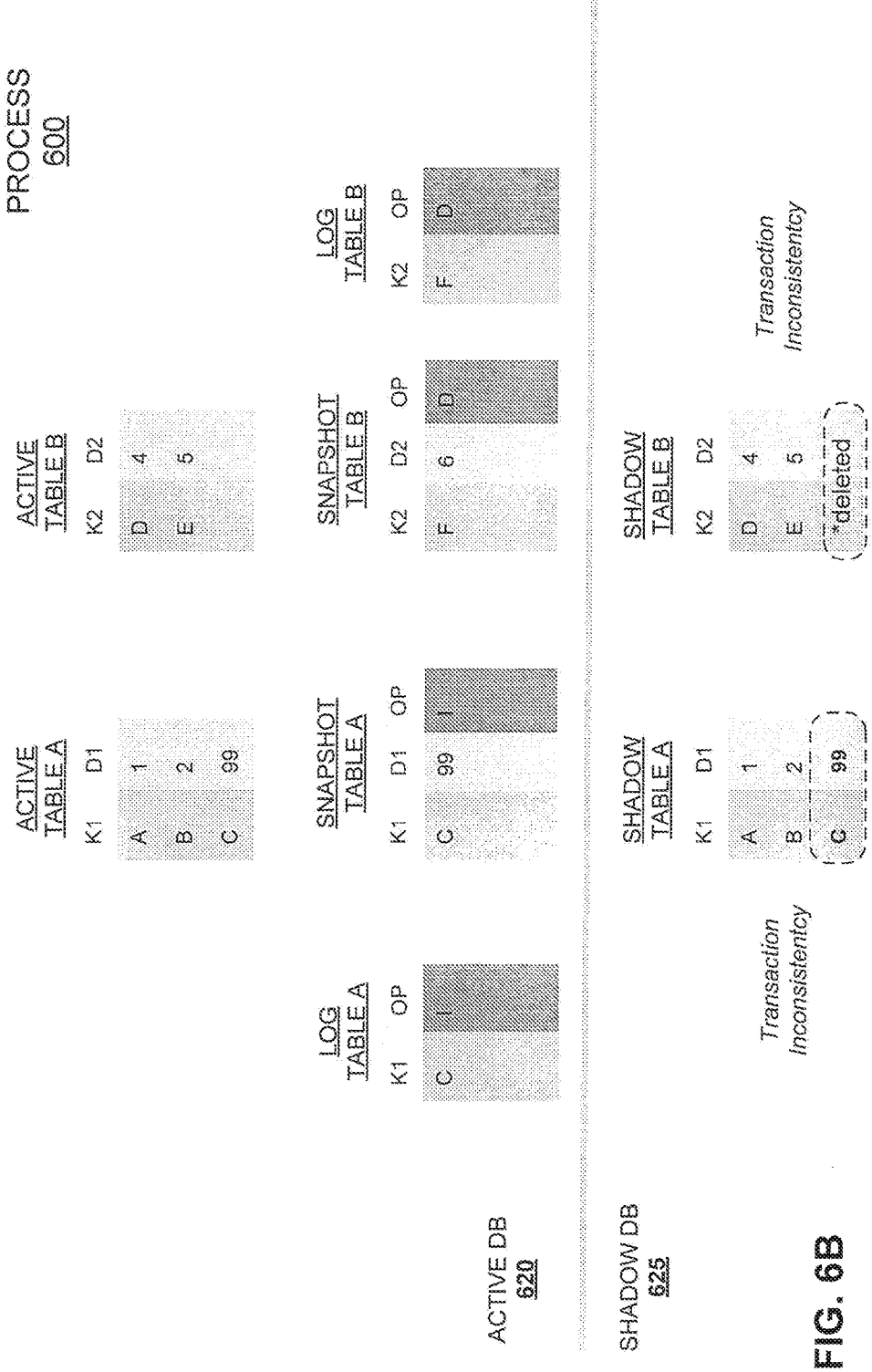
Figure 6C:
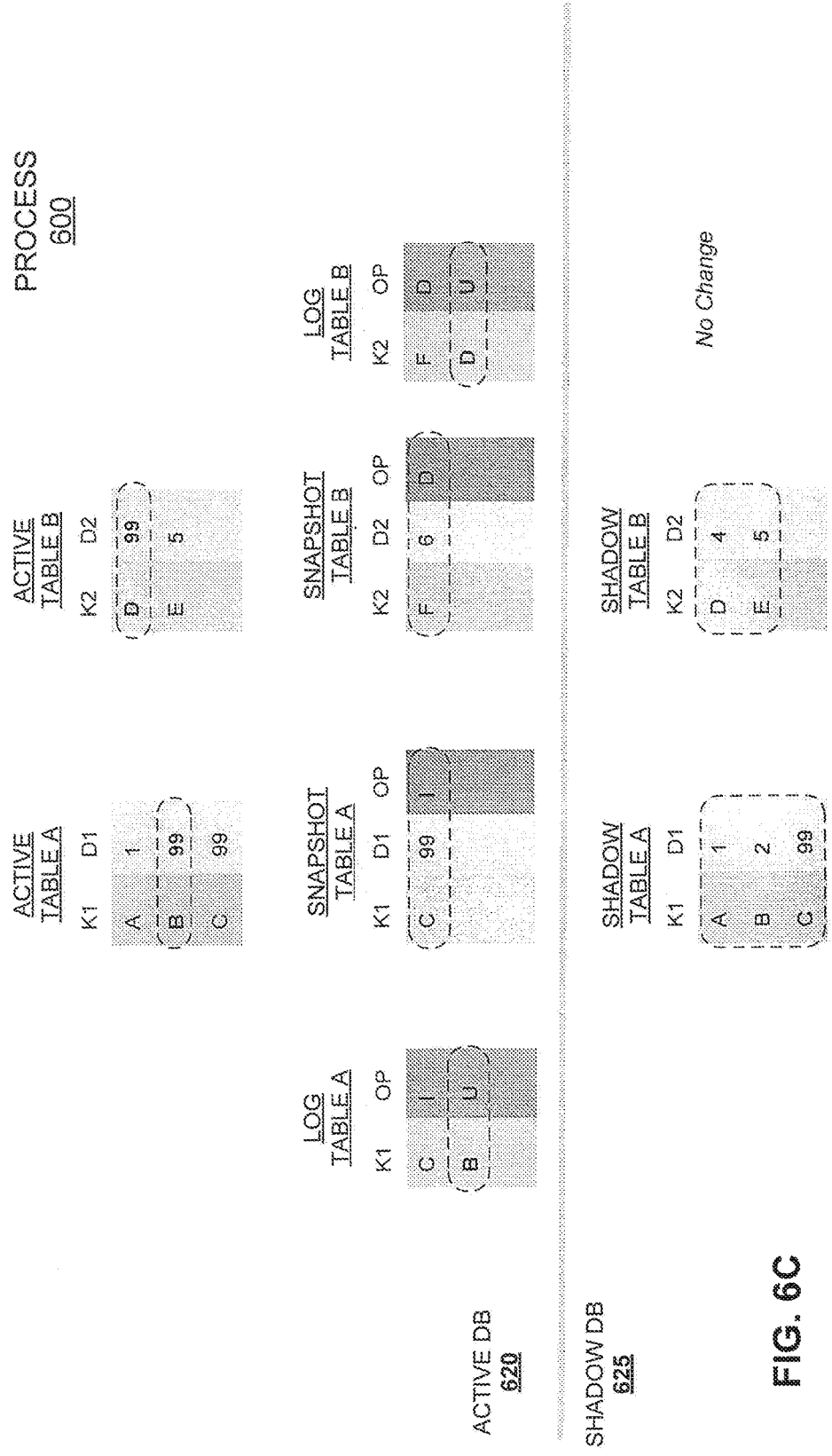

FIG. 6B depicts the resulting data configuration after the copy operation has completed for the insert/delete data change operations. As shown, there is a transaction inconsistency in both shadow database tables A and B. FIG. 6C depicts the case where logging is still active in the active database system 620 to capture subsequent data change operations on the active database system 620. As shown, updates to data entry B and D have been performed at active database tables A and B respectively. These data updates and their associated data change operation reference identifiers are reflected in the log tables A and B respectively. However, the snapshot tables A and B and the shadow database tables A and B are not updated. As discussed above, after the copy process completes, the snapshot tables and the shadow database tables are no longer updated with subsequent data change operations performed in the active database system 620.

Figure 6D:
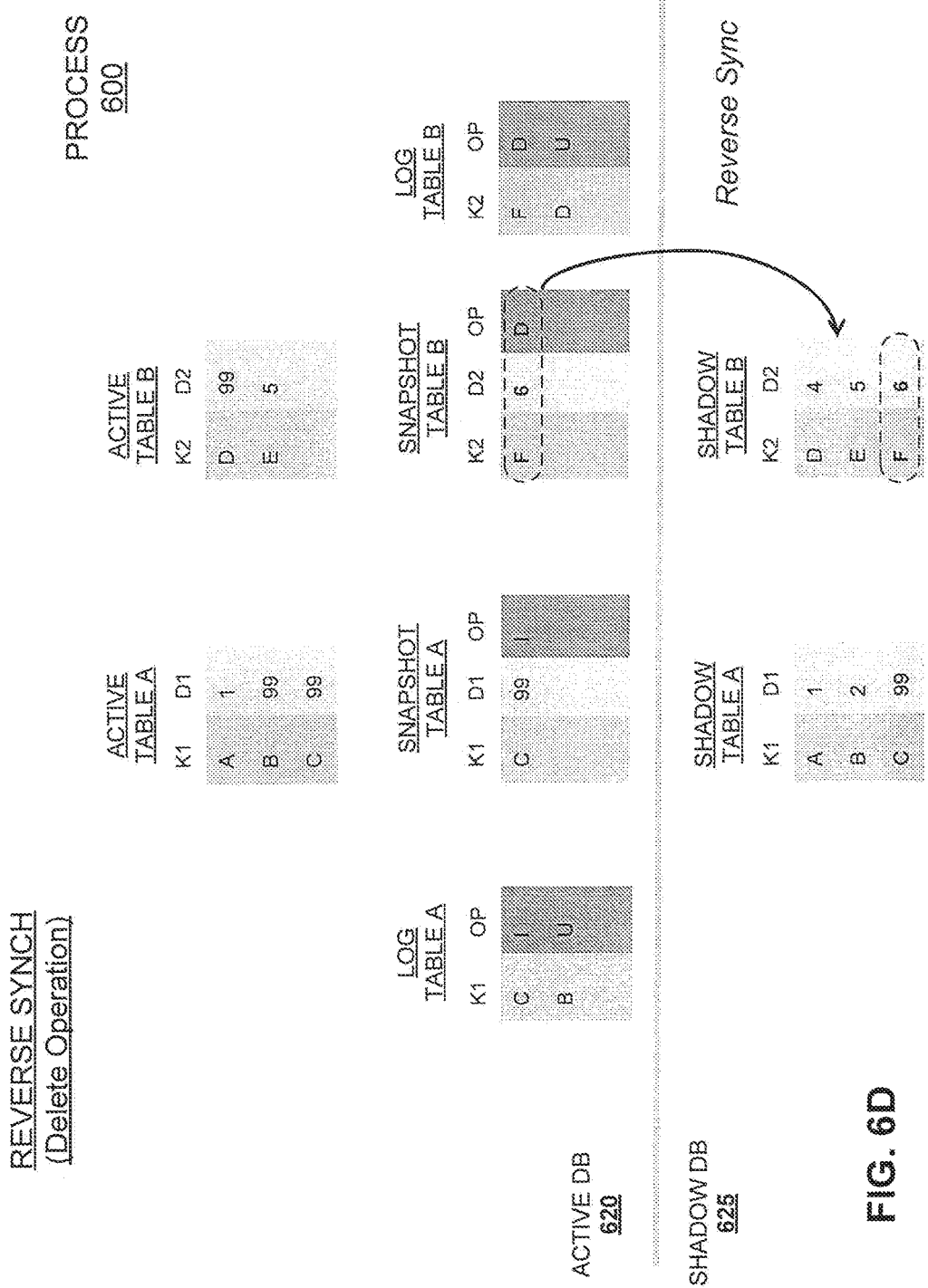
Figure 6E:
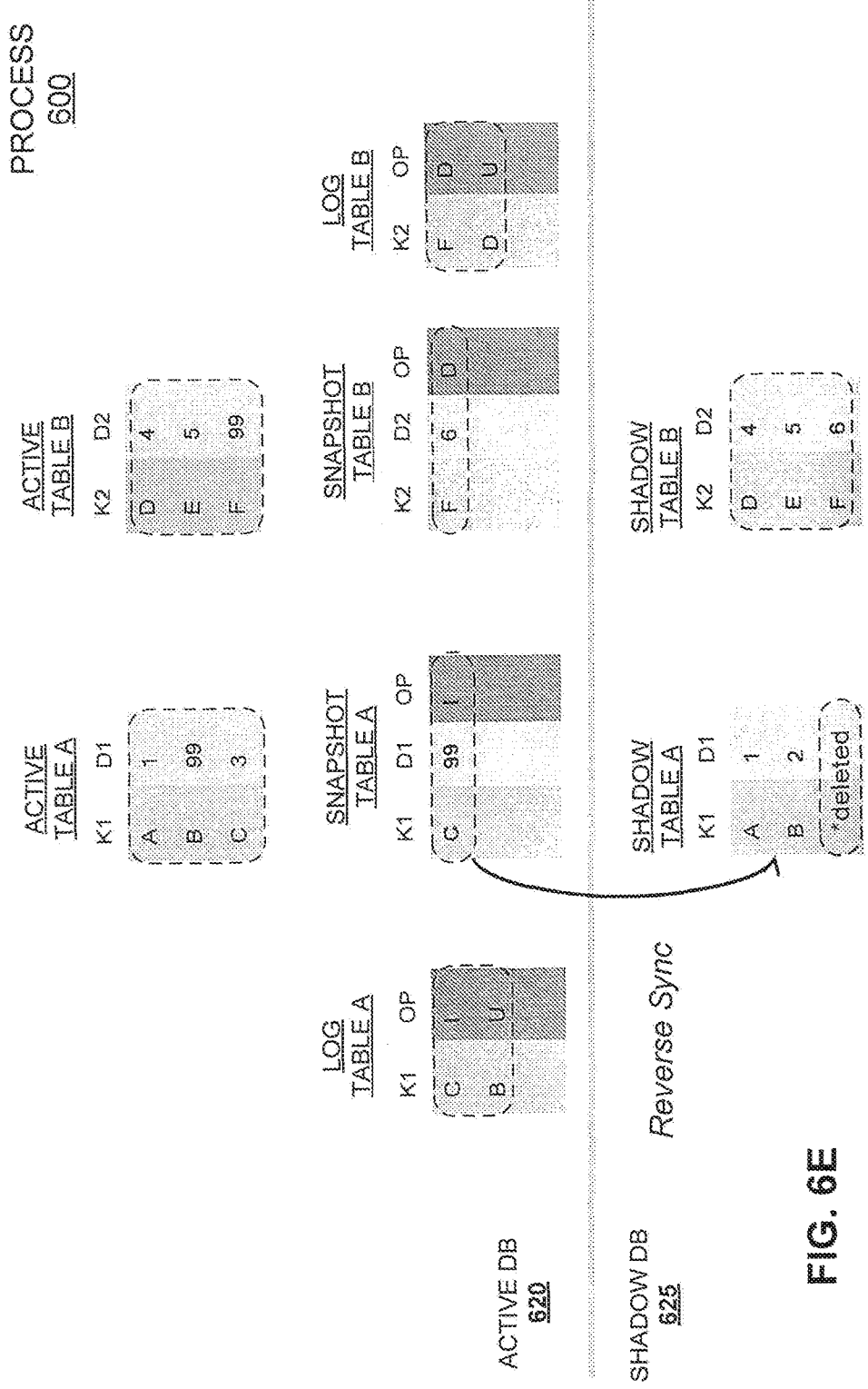

FIGS. 6D and 6E depict the reverse synch operations performed on the shadow database tables B and A respectively. In the case of shadow database table B of FIG. 6D, the deletion was already copied to the data entry F of the shadow database table, and so the data change must be restored to the original entry by inserting the value 6 from the data entry F in the snapshot table B back into entry F of the shadow database table B. And in the case of shadow database table A of FIG. 6E, the insertion was already copied to the data entry C of the shadow database table A, and so the data change must be restored to the original entry by deleting the value 99 in the data entry C from the shadow database table B. This completes process 600 according to an example embodiment.

Figure 7A:
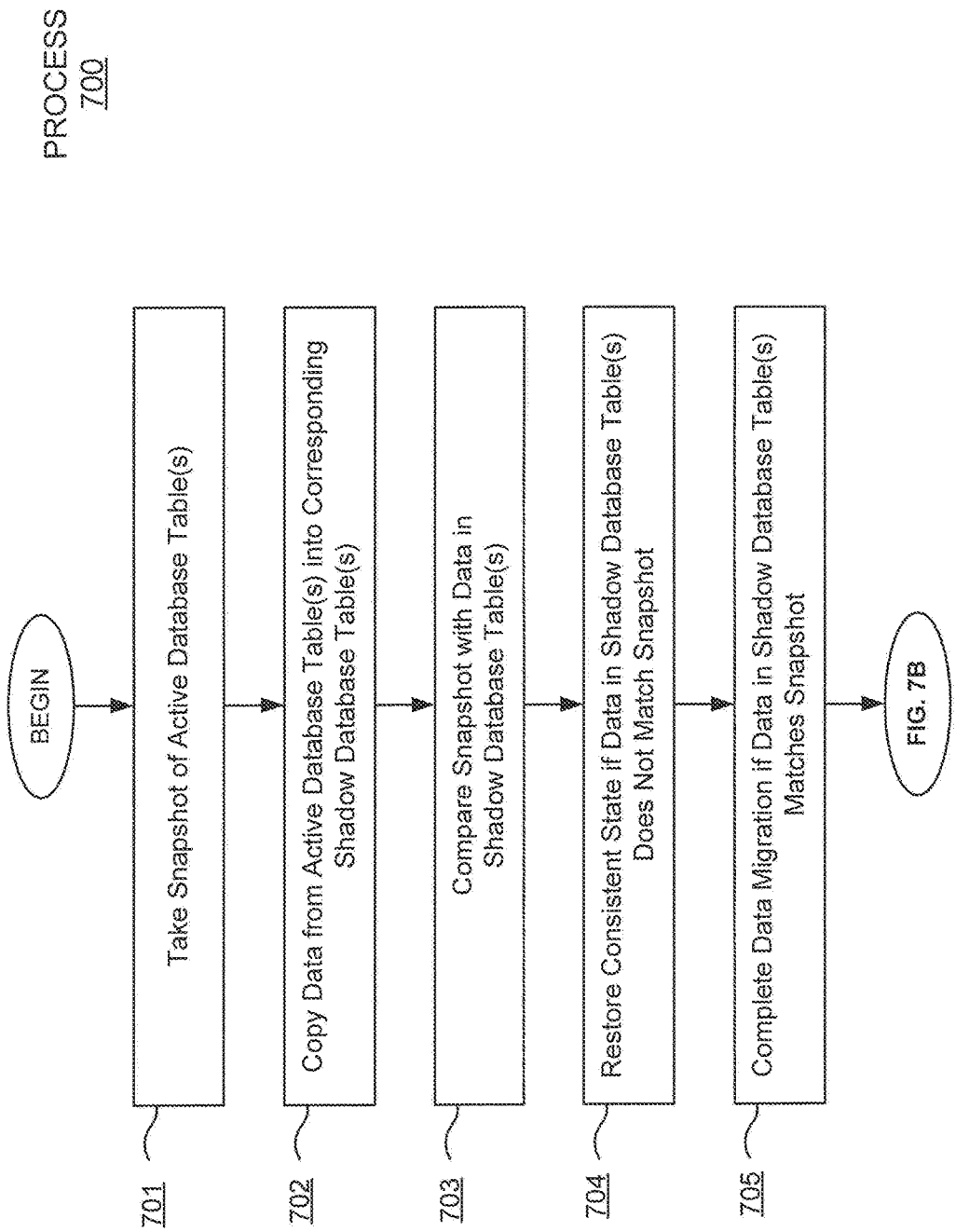

FIGS. 7A-7B depict an example embodiment of a process for maintaining a consistent state during data migration from an active database system to a shadow database system. In the illustrated embodiment of FIG. 7A, process 700 begins by generating a snapshot of the data in the database tables in the active database system (operation 701). The snapshot can be taken by storing an image of the data in an active database table into a snapshot table at a specified point in time. The data can then be copied into a corresponding database table of a shadow database system (operation 702). In one embodiment, the data can be copied during a time interval when active data operations are being performed on the data in the active database system.

As discussed above, typically data migration operations can take an extensive amount of time to copy database tables from an active database system to a shadow system. For instance, it can take several hours or even days to complete the copy process in certain cases. Accordingly, in at least certain embodiments, the techniques described herein are adapted to perform the copying of the data while the active database system is operational and accepting data access commands from applications and users. That is, the data migration operations can be performed while data change operations are being conducted on the data in the active database system—including update, insert, or delete data change operations.

Process 700 continues by comparing the data stored in the database table of the shadow database system with the data stored in the snapshot table (operation 703). A consistent state can be restored if the data in the database table of the shadow database system does not match the data in the snapshot table (operation 704). In one embodiment, the restoring operation includes copying the snapshot image stored in the snapshot table into the database table of the shadow database system when the data in the database table of the shadow database system does not match the data in the snapshot table. The data migration completes when the data stored in the database table of the shadow database system matches the data in the snapshot table (operation 705).

Referring to FIG. 7B, process 700 continues at operation 706 where one or more data change operations can be received after the specified point in time. The data change operations can be adapted to perform changes to the data in the data table of the active database system. The data change operations include updating the data in the database tables, inserting new data into the database tables, or deleting data from the database tables. The changes to the data can be recorded in a log table (operation 707). In one embodiment, references to the data change operations can also be stored in the log table along with the data changes (operation 708).

The data change operations recorded in the log table can then be replayed on the data in the database table of the shadow database system to capture changes to the data after the specified point in time (operation 709). This brings the shadow database system and the active database system to a consistent state. The data migration completes when the data stored in the database table of the shadow database system matches the data in snapshot table (operation 710). This completes process 700 according to one example embodiment.

As discussed above, the database tables of the active database system are generally copied separately into the shadow database system in any order due to the time constraints the data migration process and the total amount of data to be copied. Thus the techniques described herein can be adapted to copy the database tables of the active database system to the shadow database system without knowledge of dependencies between database tables.

During the restore operation, the data from the database table of the shadow database system can be deleted when the data change operation was an insert operation, or it can be inserted when the data change operation was a delete operation.

Further, in one embodiment, the data migration includes migrating the data to a different database. In an alternate embodiment, the data migration process includes migrating the data within a same database. This completes process 700 according to one example embodiment.

IV. Exemplary Hardware Implementation

Embodiments of the present invention may be practiced using various computer systems including hand-held devices, microprocessor systems, programmable electronics, laptops, tablets and the like. The embodiments can also be practiced in distributed computing environments where tasks are performed by remote processing devices that are linked through one or more wire-based or wireless networks.

Figure 8:
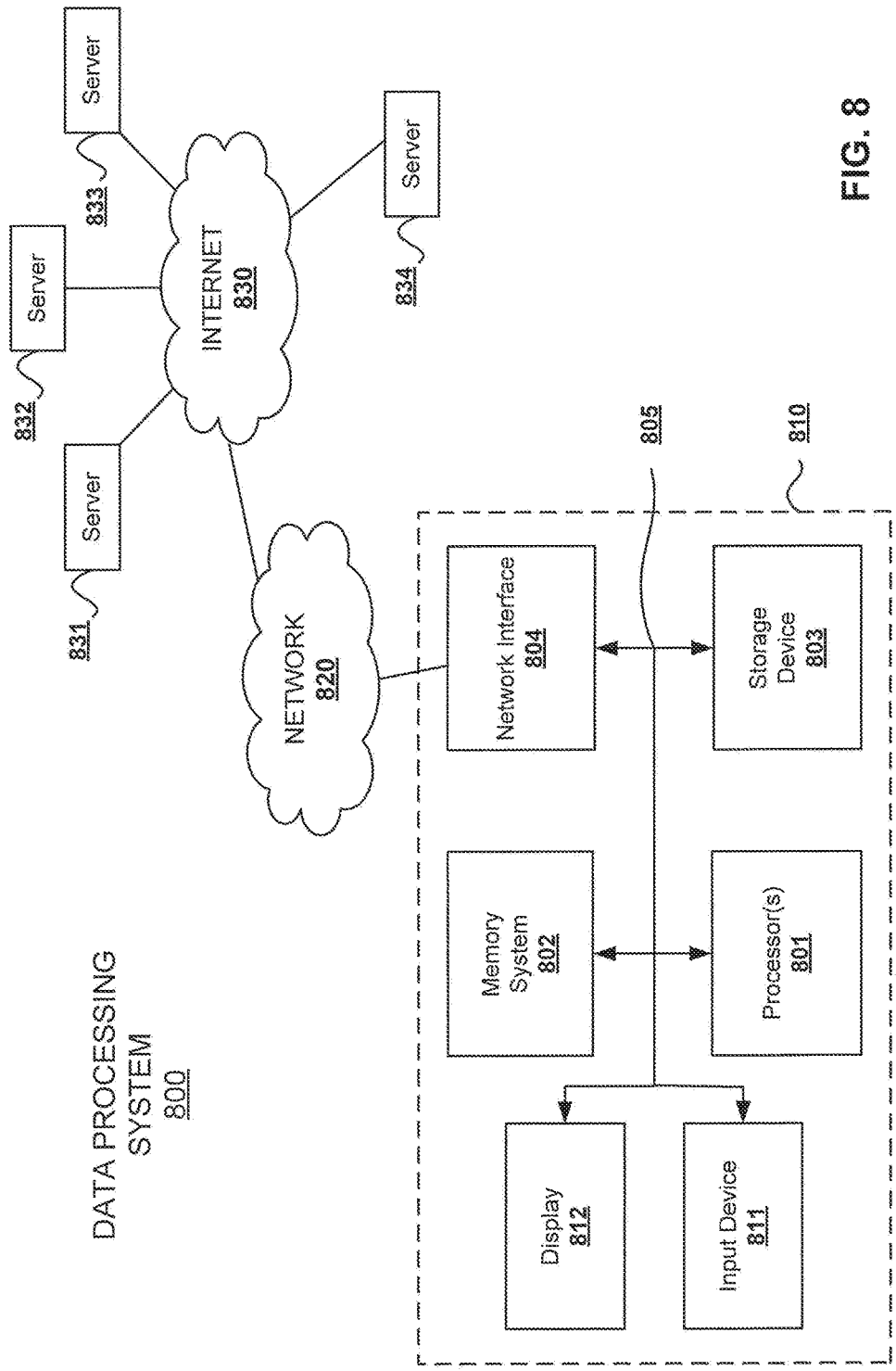
FIG. 8 depicts an example overview block diagram of a data processing system upon which the embodiments described herein may be implemented.

FIG. 8 depicts an example overview block diagram of a data processing system upon which the embodiments described herein may be implemented. The following hardware description is merely one example. It is to be understood that a variety of computers configurations may be used to implement the described techniques. While FIG. 8 illustrates various components of a data processing system 800, it is not intended to represent any particular architecture or manner of interconnecting components. It will also be appreciated that network computers and other data processing systems, which have fewer components or additional components, may be used. The data processing system 800 may, for example, comprise a personal computer (PC), workstation, laptop computer, tablet, smartphone or other hand-held wireless device, or any device having similar functionality.

In the illustrated embodiment, data processing system 800 includes a computer system 810. Computer system 810 includes an interconnect bus 805 (or other communication mechanism for communicating information) and one or more processor(s) 801 coupled with the interconnect bus 805 for processing information. Computer system 810 also includes a memory system 802 coupled with the one or more processors 801 via the interconnect bus 805. Memory system 802 is configured to store information and instructions to be executed by processor 801, including information and instructions for performing the techniques described above. This memory system may also be used for storing programs executed by processor(s) 801. Possible implementations of this memory system may be, but are not limited to, random access memory (RAM), read only memory (ROM), or combination thereof.

In the illustrated embodiment, a storage device 803 is also provided for storing information and instructions. Typically storage device 803 comprises nonvolatile memory. Common forms of storage devices include, for example, a hard drive, a magnetic disk, an optical disk, a CD-ROM, a DVD, a flash or other non-volatile memory, a USB memory card, or any other computer-readable medium from which a computer can read data and instructions. Storage device 803 may store source code, binary code, or software files for performing the techniques above. In addition, while FIG. 8 shows that storage device 803 as a local device connected with the components of the data processing system, it will be appreciated by skilled artisans that the described techniques may use a storage device remote from the system, such as a database or other network storage device coupled with the computer system 810 through a network interface such as network interface 804.

Network interface 804 may provide communications between computer system 810 and a network 820. The network interface 804 may be a wireless or wired connection, or any combination thereof. Computer system 810 is configured to send and receive information through the network interface 804 across one or more networks 820 such as a local area network (LAN), wide-area network (WAN), wireless or Bluetooth network, or the Internet 830, etc. Computer system 810 may access data and features on systems residing on one or multiple different hardware servers 831-834 across the network 820. Hardware servers 831-834 and associated server software may also reside in a cloud computing environment.

Storage device and memory system are both examples of non-transitory computer readable storage media. Embodiments herein can be embodied in computer-readable code stored on any computer-readable medium, which when executed by a computer or other data processing system, can be adapted to cause the system to perform operations according to the techniques described herein. Computer-readable media may include any mechanism that stores information in a form accessible by a data processing system such as a computer, network device, tablet, smartphone, or any device having similar functionality. Examples of computer-readable media include any type of non-transitory, tangible media capable of storing information thereon, including floppy disks, hard drive disks ("HDDs"), solid-state devices ("SSDs") or other flash memory, optical disks, digital video disks ("DVDs"), CD-ROMs, magnetic-optical disks, ROMs, RAMs, erasable programmable read only memory ("EPROMs"), electrically erasable programmable read only memory ("EEPROMs"), magnetic or optical cards, or any other type of media suitable for storing data and instructions in an electronic format. Computer-readable media can also be distributed over a network-coupled computer system stored and executed in a distributed fashion.

Further, computer system 810 may be coupled via interconnect bus 805 to a display 812 for displaying information to a computer user. An input device 811 such as a keyboard, touchscreen, and/or mouse is coupled to bus 805 for communicating information and command selections from the user to processor 801. The combination of these components allows the user to communicate with the system. In some systems, bus 805 represents multiple specialized interconnect buses.

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a computer system. The techniques may be carried out in a computer system or other data processing system in response executing sequences of instructions stored in memory.

Throughout the foregoing description, for the purposes of explanation, numerous specific details were set forth in order to provide a thorough understanding of the invention. It will be apparent, however, to persons skilled in the art that these embodiments may be practiced without some of these specific details. The above examples and embodiments should not be deemed to be the only embodiments, and are presented to illustrate the flexibility and advantages of the present invention. Other arrangements, embodiments, implementations and equivalents will be evident to those skilled in the art and may be employed without departing from the spirit and scope of the invention as defined by the following claims.

What is claimed is:

1. A method for maintaining a consistent state during data migration in a database system comprising:
   copying data in a plurality of database tables in an active database system into a corresponding plurality of database tables of a shadow database system during a time interval when active data operations are being performed on the data in the active database system;
   in response to a trigger based on a data change operation on a first data entry in a first database table that has not been fully copied during the time interval:
      storing a snapshot data entry in a snapshot table, wherein the snapshot table corresponds to the first database table and the snapshot data entry corresponds to the first data entry before the data change operation is performed; and
      storing a log entry in a log table, wherein the log table corresponds to the first database table and the log entry specifies the first data entry and the data change operation;
   after the data has been copied into the database table of the shadow database system, comparing the data stored in a database table of the shadow database system corresponding to the first database table in the active database system with the corresponding data stored in the snapshot table;
   restoring a consistent state when the data in the database table of the shadow database system does not match the corresponding data in the snapshot table, wherein restoring comprises copying data stored in the snapshot table into the database table of the shadow database system; and
   completing data migration when the data stored in the database table of the shadow database system matches the data stored in the snapshot table.

2. The method of claim 1 further comprising replaying the one or more data change operations recorded in the log table on the data in the database table of the shadow database system to capture changes to the data after the specified point in time.

3. The method of claim 2 wherein the replaying further comprises deleting data from the database table of the shadow database system when the data change operation was an insert operation.

4. The method of claim 2 wherein the replaying further comprises inserting data from the database table of the shadow database system when the data change operation was an insert operation.

5. The method of claim 1 wherein database tables of the active database system are copied separately into the shadow database system in any order.

6. The method of claim 1 wherein database tables of the active database system are copied to the shadow database system without knowledge of dependencies between database tables.

7. The method of claim 1 wherein the data change operations include an update, insert, and delete operations.

8. The method of claim 1 wherein the data migration includes migrating the data to a different database.

9. The method of claim 1 wherein the data migration includes migrating the data within a same database.

10. A database system for maintaining a consistent state during data migration comprising:

a processor;

a memory coupled with the processor via an interconnect line;

a database configured to store data in database tables;

an update management engine in communication with the database, the update management engine configured to:

copy data in a plurality of database tables in an active database system into a corresponding plurality of database tables of a shadow database system during a time interval when active data operations are being performed on the data in the active database system;

in response to a trigger based on a data change operation on a first data entry in a first database table that has not been fully copied during the time interval:

storing a snapshot data entry in a snapshot table, wherein the snapshot table corresponds to the first database table and the snapshot data entry corresponds to the first data entry before the data change operation is performed; and storing a log entry in a log table, wherein the log table corresponds to the first database table and the log entry specifies the first data entry and the data change operation;

after the data has been copied into the database table of the shadow database system, comparing the data stored in a database table of the shadow database system corresponding to the first database table in the active database system with the corresponding data stored in the snapshot table;

restore a consistent state when the data in the database table of the shadow database system does not match the corresponding data in the snapshot table, wherein restoring comprises copying data stored in the snapshot table into the database table of the shadow database system; and complete data migration when the data stored in the database table of the shadow database system matches the data stored in the snapshot table.

11. The database system of claim 10 wherein restoring the consistent state further comprises replaying the one or more data change operations recorded in the log table on the data in the database table of the shadow database system to capture changes to the data after the specified point in time.

12. The database system of claim 10 wherein database tables of the active database system are copied to the shadow database system without knowledge of dependencies between database tables.

13. The database system of claim 10 wherein the data change operations include update, insert, and delete operations.

14. A non-transitory computer readable storage medium comprising computer executable code, which when executed, causes a computer system to perform operations for maintaining a consistent state during data migration, the operations comprising:

copying data in a plurality of database tables in an active database system into a corresponding plurality of database tables of a shadow database system during a time interval when active data operations are being performed on the data in the active database system;

in response to a trigger based on a data change operation on a first data entry in a first database table that has not been fully copied during the time interval:

storing a snapshot data entry in a snapshot table, wherein the snapshot table corresponds to the first database table and the snapshot data entry corresponds to the first data entry before the data change operation is performed; and storing a log entry in a log table, wherein the log table corresponds to the first database table and the log entry specifies the first data entry and the data change operation;

after the data has been copied into the database table of the shadow database system, comparing the data stored in a database table of the shadow database system corresponding to the first database table in the active database system with the corresponding data stored in the snapshot table;

restoring a consistent state when the data in the database table of the shadow database system does not match the corresponding data in the snapshot table, wherein restoring comprises copying data stored in the snapshot table into the database table of the shadow database system; and completing data migration when the data stored in the database table of the shadow database system matches the data stored in the snapshot table.

15. The computer readable storage medium of claim 14 wherein restoring the consistent state further comprises replaying the one or more data change operations recorded in the log table on the data in the database table of the shadow database system to capture changes to the data after the specified point in time.

16. The computer readable storage medium of claim 14 wherein database tables of the active database system are copied to the shadow database system without knowledge of dependencies between database tables.

17. The computer readable storage medium of claim 14 wherein the data change operations include update, insert, or delete operations.

* * * * *